(12) United States Patent
Schindler et al.

(10) Patent No.: US 11,906,421 B2
(45) Date of Patent: Feb. 20, 2024

(54) ENHANCED MATERIAL DETECTION BY STEREO BEAM PROFILE ANALYSIS

(71) Applicant: TRINAMIX GMBH, Ludwigshafen am Rhein (DE)

(72) Inventors: Patrick Schindler, Ludwigshafen am Rhein (DE); Ruben Huehnerbein, Ludwigshafen am Rhein (DE); Christian Lennartz, Ludwigshafen am Rhein (DE); Jakob Unger, Freiburg im Breisgau (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 0 days.

(21) Appl. No.: 18/363,488

(22) Filed: Aug. 24, 2023

(65) Prior Publication Data

US 2024/0011891 A1    Jan. 11, 2024

Related U.S. Application Data

(63) Continuation of application No. PCT/EP2023/051517, filed on Jan. 23, 2023.

(30) Foreign Application Priority Data

Jan. 24, 2022    (EP) ..................................... 22153038

(51) Int. Cl.
*G01N 21/01* (2006.01)
*H04N 13/254* (2018.01)
(Continued)

(52) U.S. Cl.
CPC ........... *G01N 21/01* (2013.01); *G06V 10/145* (2022.01); *G06V 10/147* (2022.01); *G06V 10/60* (2022.01);
(Continued)

(58) Field of Classification Search
CPC .... G01N 21/01; H04N 13/254; H04N 13/239; G06V 10/60; G06V 10/751;
(Continued)

(56) References Cited

U.S. PATENT DOCUMENTS 6,377,700 B1 * 4/2002 Mack .................... H04N 13/246
348/E13.016
9,482,529 B2 * 11/2016 Becker ................. G01B 11/002
(Continued)

*Primary Examiner* — Rowina J Cattungal
(74) *Attorney, Agent, or Firm* — Armstrong Teasdale LLP

(57) ABSTRACT

A detector (110) for determining at least one material property of at least one object (112) is proposed. The detector (110) comprises
at least one projector (116) configured for illuminating the object (112) with at least one illumination pattern (118) comprising a plurality of illumination features (120);
at least one first camera (122) having at least one first sensor element, wherein the first sensor element has a matrix of first optical sensors, the first optical sensors each having a light-sensitive area, wherein each first optical sensor is designed to generate at least one sensor signal in response to an illumination of its respective light-sensitive area by a reflection light beam propagating from the object (112) to the first camera (122), wherein the first camera (122) is configured for imaging at least one first reflection image comprising a plurality of first reflection features generated by the object (112) in response to illumination by the illumination features (120), wherein the first camera (122) is arranged such that the first reflection image is imaged under a first direction of view to the object (112);
at least one second camera (124) having at least one second sensor element, wherein the second sensor element has a matrix of second optical sensors, the second optical sensors each having a light-sensitive area, wherein each second optical sensor is designed to
(Continued)

Figure 1:
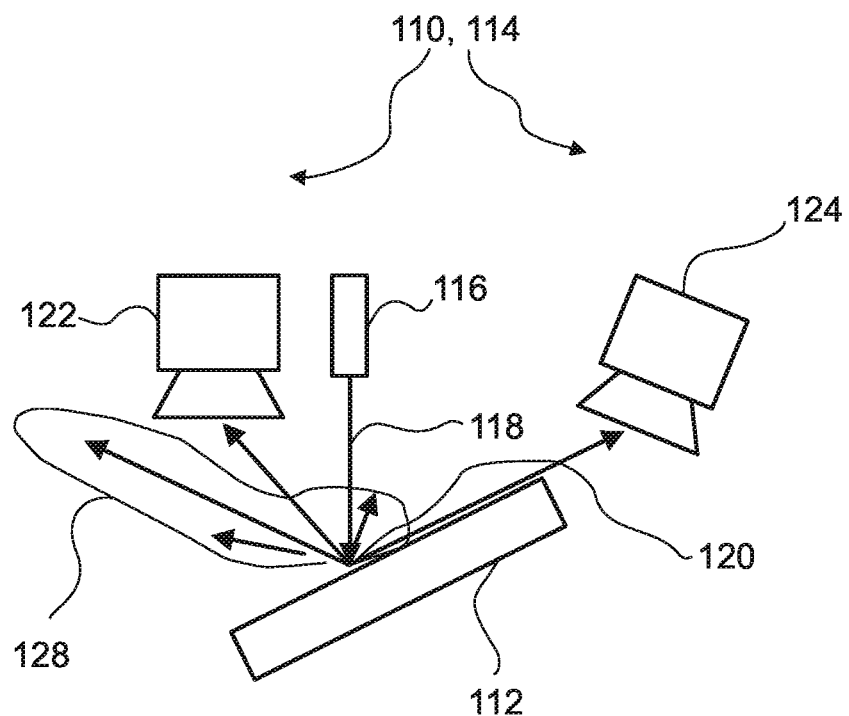
Figure 1:
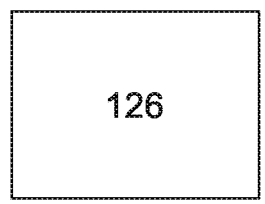

generate at least one sensor signal in response to an illumination of its respective light-sensitive area by a reflection light beam propagating from the object (112) to the second camera (124), wherein the second camera (124) is configured for imaging at least one second reflection image comprising a plurality of second reflection features generated by the object (112) in response to illumination by the illumination feature (120), wherein the second camera (124) is arranged such that the second reflection image is imaged under a second direction of view to the object (112), wherein the first direction of view and the second direction of view differ;

at least one evaluation device (126) configured for evaluating the first reflection image and the second reflection image, wherein the evaluation comprises matching the first reflection features and the second reflection features and determining a combined material property of matched pairs of first and second reflection features by analysis of their beam profiles.

24 Claims, 2 Drawing Sheets

(51) Int. Cl.
*H04N 13/239* (2018.01)
*G06V 10/764* (2022.01)
*G06V 10/145* (2022.01)
*G06V 10/60* (2022.01)
*G06V 10/75* (2022.01)
*G06V 10/147* (2022.01)
*H04N 13/00* (2018.01)
*G01N 21/17* (2006.01)

(52) U.S. Cl.
CPC .......... *G06V 10/751* (2022.01); *G06V 10/759* (2022.01); *G06V 10/764* (2022.01); *H04N 13/239* (2018.05); *H04N 13/254* (2018.05); *G01N 2021/0106* (2013.01); *G01N 2021/177* (2013.01); *H04N 2013/0074* (2013.01)

(58) Field of Classification Search
CPC .. G06V 10/759; G06V 10/147; G06V 10/145; G06V 10/764
See application file for complete search history.

(56) References Cited

U.S. PATENT DOCUMENTS

| | | | |
|---|---|---|---|
| 10,516,876 B2* | 12/2019 | Hicks | H04N 23/741 |
| 2012/0242795 A1* | 9/2012 | Kane | H04N 13/211 |
| | | | 348/46 |
| 2014/0120319 A1* | 5/2014 | Joseph | H04N 13/254 |
| | | | 348/46 |
| 2016/0139243 A1* | 5/2016 | Send | G01S 5/163 |
| | | | 250/221 |
| 2016/0253821 A1* | 9/2016 | Romano | G06V 10/141 |
| | | | 382/103 |
| 2018/0007343 A1* | 1/2018 | Send | H04N 13/271 |
| 2018/0033146 A1* | 2/2018 | Bleyer | G01B 11/2513 |
| 2018/0047208 A1* | 2/2018 | Marin | H04N 13/133 |
| 2021/0358157 A1* | 11/2021 | Ohnishi | H04N 13/239 |

* cited by examiner

ENHANCED MATERIAL DETECTION BY STEREO BEAM PROFILE ANALYSIS

CROSS-REFERENCE TO RELATED APPLICATIONS

This application is a bypass U.S. Continuation Application of International Patent Application No. PCT/EP23/51517, filed Jan. 23, 2023, which claims priority to European Patent Application No. 22153038.9, filed Jan. 24, 2022, each of which is hereby incorporated by reference herein.

TECHNICAL FIELD

The invention relates to a detector for determining at least one material property, a method for determining a material property, a mobile device and various uses. The devices, methods and uses according to the present invention specifically may be employed for example in various areas of daily life, security technology, gaming, traffic technology, production technology, photography such as digital photography or video photography for arts, documentation or technical purposes, safety technology, information technology, agriculture, crop protection, maintenance, cosmetics, medical technology or in the sciences. However, other applications are also possible.

BACKGROUND ART

Depth measurement using beam profile analysis (BPA), also denoted as depth-from-photon-ratio technique (DPR) is generally known. With respect to beam profile analysis reference is made to WO 2018/091649 A1, WO 2018/091638 A1, WO 2018/091640 A1 and C. Lennartz, F. Schick, S. Metz, "Whitepaper—Beam Profile Analysis for 3D imaging and material detection" Apr. 28, 2021, Ludwigshafen, Germany, the full content of which is included by reference.

Material classification and/or identification using beam profile analysis is known, e.g. from WO 2020/187719. For example, material classification and/or identification can be used in machine vision applications, medical applications and security applications, for image classification purposes or in gesture recognition algorithms.

A BPA 3D measurement system considers beam profiles and extract relevant material information. The BPA 3D measurement system has one camera and one projector.

WO 2020/187719 describes a detector for identifying at least one material property m. The detector comprises at least one sensor element comprising a matrix of optical sensors. The optical sensors each having a light-sensitive area. The sensor element is configured for recording at least one reflection image of a light beam originating from at least one object. The detector comprises at least one evaluation device configured for determining the material property by evaluation of at least one beam profile of the reflection image. The evaluation device is configured for determining at least one distance feature by applying at least one distance dependent image filter to the reflection image. The evaluation device is configured for determining at least one material feature by applying at least one material dependent image filter to the reflection image. The evaluation device is configured for determining a longitudinal coordinate z and the material property m by evaluating the distance feature and the material feature.

However, despite the achievements described above, reliable material classification and/or identification is still an ongoing challenge.

Problem to be Solved

It is therefore an object of the present invention to provide devices and methods facing the above-mentioned technical challenges of known devices and methods. Specifically, it is an object of the present invention to provide devices and methods which reliably may identify at least one material property of an object, preferably with a low technical effort and with low requirements in terms of technical resources and cost.

SUMMARY

This problem is solved by the invention with the features of the independent patent claims. Advantageous developments of the invention, which can be realized individually or in combination, are presented in the dependent claims and/or in the following specification and detailed embodiments.

In a first aspect of the present invention a detector for determining at least one material property of at least one object is disclosed.

The term "detector" as used herein is a broad term and is to be given its ordinary and customary meaning to a person of ordinary skill in the art and is not to be limited to a special or customized meaning. The term specifically may refer, without limitation, to an arbitrary sensor device configured for determining and/or detecting and/or sensing the at least one object. The detector may be a stationary device or a mobile device. Further, the detector may be a stand-alone device or may form part of another device, such as a computer, a vehicle or any other device. Further, the detector may be a hand-held device. Other embodiments of the detector are feasible. The detector may be one of attached to or integrated into a mobile device such as a mobile phone or smartphone. The detector may be integrated in a mobile device, e.g. within a housing of the mobile device. Additionally or alternatively, the detector, or at least one component of the detector, may be attached to the mobile device such as by using a connector such as a USB or phone-connector such as the headphone jack.

The term "object" as used herein is a broad term and is to be given its ordinary and customary meaning to a person of ordinary skill in the art and is not to be limited to a special or customized meaning. The term specifically may refer, without limitation, to an arbitrary object, in particular a surface or region, which is configured for at least partially one or more of reflecting and/or scattering and/or emitting in response to at least one light beam impinging on the object. The light beam may originate from a projector illuminating the object, wherein the light beam is reflected and/or scattered by the object. For example, the object may be at least one object selected from the group consisting of: a scene, a human such as a human, wood, carpet, foam, an animal such as a cow, a plant, a piece of tissue, a metal, a toy, a metallic object, a beverage, a food such as a fruit, meat, fish, a dish, a cosmetics product, an applied cosmetics product, cloth, fur, hair, a maintenance product, a cream, an oil, a powder, a carpet, a juice, a suspension, a paint, a plant, a body, a part of a body, organic material, inorganic material, a reflective material, a screen, a display, a wall, a sheet of paper, such as photograph.

The term "material property" as used herein is a broad term and is to be given its ordinary and customary meaning to a person of ordinary skill in the art and is not to be limited to a special or customized meaning. The term specifically may refer, without limitation, to at least one arbitrary property of a material configured for characterizing and/or identification and/or classification of the material. For example, the material property may be a property selected from the group consisting of: roughness, penetration depth of light into the material, a property characterizing the material as biological or non-biological material, a reflectivity, a specular reflectivity, a diffuse reflectivity, a surface property, a measure for translucence, a scattering, specifically a back-scattering behavior or the like. The at least one material property may be a property selected from the group consisting of: a scattering coefficient, a translucency, a transparency, a deviation from a Lambertian surface reflection, a speckle, and the like.

The term "determining at least one material property" as used herein is a broad term and is to be given its ordinary and customary meaning to a person of ordinary skill in the art and is not to be limited to a special or customized meaning. The term specifically may refer, without limitation, to one or more of identifying, characterizing, and assigning the material property to the object. The detector may comprise at least one database comprising a list and/or table, such as a lookup list or a lookup table, of predefined and/or predetermined material properties. The list and/or table of material properties may be determined and/or generated by performing at least one test measurement using the detector, for example by performing material tests using samples having known material properties. The list and/or table of material properties may be determined and/or generated at the manufacturer site and/or by the user of the detector. The material property may additionally be assigned to a material classifier such as one or more of a material name, a material group such as biological or non-biological material, translucent or non-translucent materials, metal or non-metal, skin or non-skin, fur or non-fur, carpet or non-carpet, reflective or non-reflective, specular reflective or non-specular reflective, foam or non-foam, hair or non-hair, roughness groups or the like. The detector may comprise at least one database comprising a list and/or table comprising the material properties and associated material name and/or material group.

The detector comprises
- at least one projector configured for illuminating the object with at least one illumination pattern comprising a plurality of illumination features;
- at least one first camera having at least one first sensor element, wherein the first sensor element has a matrix of first optical sensors, the first optical sensors each having a light-sensitive area, wherein each first optical sensor is designed to generate at least one sensor signal in response to an illumination of its respective light-sensitive area by a reflection light beam propagating from the object to the first camera, wherein the first camera is configured for imaging at least one first reflection image comprising a plurality of first reflection features generated by the object in response to illumination by the illumination features, wherein the first camera is arranged such that the first reflection image is imaged under a first direction of view to the object;
- at least one second camera having at least one second sensor element, wherein the second sensor element has a matrix of second optical sensors, the second optical sensors each having a light-sensitive area, wherein each second optical sensor is designed to generate at least one sensor signal in response to an illumination of its respective light-sensitive area by a reflection light beam propagating from the object to the second camera, wherein the second camera is configured for imaging at least one second reflection image comprising a plurality of second reflection features generated by the object in response to illumination by the illumination features, wherein the second camera is arranged such that the second reflection image is imaged under a second direction of view to the object, wherein the first direction of view and the second direction of view differ;
- at least one evaluation device configured for evaluating the first reflection image and the second reflection image, wherein the evaluation comprises matching the first reflection features and the second reflection features and determining a combined material property of matched pairs of first and second reflection features by analysis of their beam profiles.

The term "projector", also denoted as light projector, as used herein is a broad term and is to be given its ordinary and customary meaning to a person of ordinary skill in the art and is not to be limited to a special or customized meaning. The term specifically may refer, without limitation, to an optical device configured to project at least one illumination pattern onto the object, specifically onto a surface of the object. The projector is configured for illuminating at least one object with at least one illumination pattern comprising a plurality of illumination features.

The term "pattern" as used herein is a broad term and is to be given its ordinary and customary meaning to a person of ordinary skill in the art and is not to be limited to a special or customized meaning. The term specifically may refer, without limitation, to an arbitrary known or pre-determined arrangement comprising a plurality of arbitrarily shaped features such as symbols. The pattern may comprise a plurality of features. The pattern may comprise an arrangement of periodic or non-periodic features. The term "at least one illumination pattern" as used herein is a broad term and is to be given its ordinary and customary meaning to a person of ordinary skill in the art and is not to be limited to a special or customized meaning. The term specifically may refer, without limitation, to at least one arbitrary pattern comprising the illumination features adapted to illuminate at least one part of the object.

The term "illumination feature" as used herein is a broad term and is to be given its ordinary and customary meaning to a person of ordinary skill in the art and is not to be limited to a special or customized meaning. The term specifically may refer, without limitation, to at least one at least partially extended feature of the pattern. The illumination pattern comprises a plurality of illumination features. For example, the illumination pattern comprises at least 4000 illumination features or even more.

The illumination pattern may be a regular, in particular periodic pattern. However, other non-regular patterns may be possible, too.

The illumination pattern may comprise at least one pattern selected from the group consisting of: at least one quasi random pattern; at least one Sobol pattern; at least one quasiperiodic pattern; at least one point pattern, in particular a pseudo-random point pattern; at least one line pattern; at least one stripe pattern; at least one checkerboard pattern; at least one triangular pattern; at least one rectangular pattern; at least one hexagonal pattern or a pattern comprising further convex tilings. The illumination pattern may exhibit the at least one illumination feature selected from the group consisting of: at least one point; at least one line; at least two lines such as parallel or crossing lines; at least one point and one line; at least one arrangement of periodic features; at least one arbitrary shaped featured pattern. For example, the illumination pattern comprises at least one pattern comprising at least one pre-known feature. For example, the illumination pattern comprises at least one line pattern comprising at least one line. For example, the illumination pattern comprises at least one line pattern comprising at least two lines such as parallel or crossing lines. For example, the projector may be configured for generate and/or to project a cloud of points or non-point-like features. For example, the projector may be configured for generate a cloud of points or non-point-like features such that the illumination pattern may comprise a plurality of point features or non-point-like features.

As further used herein, the term "illuminating the object with at least one illumination pattern" may refer to providing the at least one illumination pattern for illuminating the at least one object.

The term "ray" as used herein is a broad term and is to be given its ordinary and customary meaning to a person of ordinary skill in the art and is not to be limited to a special or customized meaning. The term specifically may refer, without limitation, to a line that is perpendicular to wavefronts of light which points in a direction of energy flow. The term "beam" as used herein is a broad term and is to be given its ordinary and customary meaning to a person of ordinary skill in the art and is not to be limited to a special or customized meaning. The term specifically may refer, without limitation, to a collection of rays. In the following, the terms "ray" and "beam" will be used as synonyms. The term "light beam" as used herein is a broad term and is to be given its ordinary and customary meaning to a person of ordinary skill in the art and is not to be limited to a special or customized meaning. The term specifically may refer, without limitation, to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. The light beam specifically may be a Gaussian light beam or a linear combination of Gaussian light beams, as will be outlined in further detail below. Other embodiments are feasible, however.

The projector may comprise at least one emitter and/or at least one array of emitters. Each of the emitters may be configured for emitting at least one light beam.

The light beams generated by the emitters generally may propagate parallel to an optical axis or tilted with respect to the optical axis, e.g. including an angle with the optical axis. The detector may be configured such that the light beam or light beams propagates from the detector towards the object along an optical axis of the detector. For this purpose, the detector may comprise at least one reflective element, preferably at least one prism, for deflecting the light beams onto the optical axis. As an example, the light beams and the optical axis may include an angle of less than 10°, preferably less than 5° or even less than 2°. Other embodiments, however, are feasible. Further, the light beams may be on the optical axis or off the optical axis. As an example, the light beam or light beams may be parallel to the optical axis having a distance of less than 10 mm to the optical axis, preferably less than 5 mm to the optical axis or even less than 1 mm to the optical axis or may even coincide with the optical axis.

The term "emitter" as used herein is a broad term and is to be given its ordinary and customary meaning to a person of ordinary skill in the art and is not to be limited to a special or customized meaning. The term specifically may refer, without limitation, to at least one arbitrary device configured for providing the at least one light beam for illumination of the object. Each of the emitters may be and/or may comprise at least one element selected from the group consisting of at least one laser source such as at least one semi-conductor laser, at least one double heterostructure laser, at least one external cavity laser, at least one separate confinement heterostructure laser, at least one quantum cascade laser, at least one distributed Bragg reflector laser, at least one polariton laser, at least one hybrid silicon laser, at least one extended cavity diode laser, at least one quantum dot laser, at least one volume Bragg grating laser, at least one Indium Arsenide laser, at least one Gallium Arsenide laser, at least one transistor laser, at least one diode pumped laser, at least one distributed feedback lasers, at least one quantum well laser, at least one interband cascade laser, at least one semiconductor ring laser, at least one vertical cavity surface-emitting laser (VCSEL); at least one non-laser light source such as at least one LED or at least one light bulb.

The array of emitters may be a two-dimensional or one dimensional array. The array may comprise a plurality of emitters arranged in a matrix. The term "matrix" as used herein is a broad term and is to be given its ordinary and customary meaning to a person of ordinary skill in the art and is not to be limited to a special or customized meaning. The term specifically may refer, without limitation, to an arrangement of a plurality of elements in a predetermined geometrical order. The matrix specifically may be or may comprise a rectangular matrix having one or more rows and one or more columns. The rows and columns specifically may be arranged in a rectangular fashion. However, other arrangements are feasible, such as nonrectangular arrangements. As an example, circular arrangements are also feasible, wherein the elements are arranged in concentric circles or ellipses about a center point.

For example, the emitters may be an array of VCSELs. The term "vertical-cavity surface-emitting laser" as used herein is a broad term and is to be given its ordinary and customary meaning to a person of ordinary skill in the art and is not to be limited to a special or customized meaning. The term specifically may refer, without limitation, to a semiconductor laser diode configured for laser beam emission perpendicular with respect to a top surface. Examples for VCSELs can be found e.g. in en.wikipedia.org/wiki/Vertical-cavity_surface-emitting_laser. VCSELs are generally known to the skilled person such as from WO 2017/222618 A. Each of the VCSELs is configured for generating at least one light beam. The VCSELs may be arranged on a common substrate or on different substrates. The array may comprise up to 2500 VCSELs. For example, the array may comprise 38×25 VCSELs, such as a high power array with 3.5 W. For example, the array may comprise 10×27 VCSELs with 2.5 W. For example, the array may comprise 96 VCSELs with 0.9 W. A size of the array, e.g. of 2500 elements, may be up to 2 mm×2 mm.

The light beam emitted by the respective emitter may have a wavelength of 300 to 1100 nm, preferably 500 to 1100 nm. For example, the light beam may have a wavelength of 940 nm. For example, light in the infrared spectral range may be used, such as in the range of 780 nm to 3.0 µm.

Specifically, the light in the part of the near infrared region where silicon photodiodes are applicable specifically in the range of 700 nm to 1100 nm may be used. The emitters may be configured for generating the at least one illumination pattern in the infrared region, in particular in the near infrared region. Using light in the near infrared region may allow that light is not or only weakly detected by human eyes and is still detectable by silicon sensors, in particular standard silicon sensors. For example, the emitters may be an array of VCSELs. The VCSELs may be configured for emitting light beams at a wavelength range from 800 to 1000 nm. For example, the VCSELs may be configured for emitting light beams at 808 nm, 850 nm, 940 nm, or 980 nm. Preferably the VCSELs emit light at 940 nm, since terrestrial sun radiation has a local minimum in irradiance at this wavelength, e.g. as described in CIE 085-1989 "Solar spectral Irradiance".

The projector may comprise at least one transfer device configured for generating the illumination features from the light beams impinging on the transfer device. The term "transfer device", also denoted as "transfer system", may generally refer to one or more optical elements which are adapted to modify the light beam, such as by modifying one or more of a beam parameter of the light beam, a width of the light beam or a direction of the light beam. The transfer device may comprise at least one imaging optical device. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system; at least one holographic optical element; at least one meta optical element. Specifically, the transfer device comprises at least one refractive optical lens stack. Thus, the transfer device may comprise a multi-lens system having refractive properties.

The projector may comprise at least one diffractive optical element (DOE) configured for generating the illumination pattern. The DOE may be configured for generating multiple light beams from a single incoming light beam.

The object may comprise at least one surface on which the illumination pattern is projected. The surface may be adapted to at least partially reflect the illumination pattern back towards the detector. For example, without wishing to be bound by this theory, human skin may have a reflection profile, also denoted back scattering profile, comprising parts generated by back reflection of the surface, denoted as surface reflection, and parts generated by very diffuse reflection from light penetrating the skin, denoted as diffuse part of the back reflection. With respect to reflection profile of human skin reference is made to "Lasertechnik in der Medizin: Grundlagen, Systeme, Anwendungen", "Wirkung von Laserstrahlung auf Gewebe", 1991, pages 171 to 266, Jürgen Eichler, Theo Seiler, Springer Verlag, ISBN 0939-0979. The surface reflection of the skin may increase with the wavelength increasing towards the near infrared. Further, the penetration depth may increase with increasing wavelength from visible to near infrared. The diffuse part of the back reflection may increase with penetrating depth of the light. These material properties may be used to distinguish skin from other materials, specifically by analyzing the back scattering profile.

The first camera has at least one first sensor element having a matrix of first optical sensors. The first optical sensors each having a light-sensitive area. Each first optical sensor is designed to generate at least one sensor signal in response to an illumination of its respective light-sensitive area by a light beam propagating from the object to the first camera. The second camera has at least one second sensor element having a matrix of second optical sensors. The second optical sensors each having a light-sensitive area. Each second optical sensor is designed to generate at least one sensor signal in response to an illumination of its respective light-sensitive area by a light beam propagating from the object to the second camera.

The first camera may comprise at least one CCD sensor or at least one CMOS sensor. The second camera may comprise at least one CCD sensor or at least one CMOS sensor.

The first and second cameras may be designed identical or different. For example, the first and second cameras may have identical or different resolutions. In the following reference is made without the prefix "first" and "second", e.g. "camera", "sensor element", and "optical sensor", to elements, definitions and embodiments valid and/or possible for the first camera and the second camera.

The term "camera" as used herein is a broad term and is to be given its ordinary and customary meaning to a person of ordinary skill in the art and is not to be limited to a special or customized meaning. The term specifically may refer, without limitation, to a device having at least one imaging element configured for recording or capturing spatially resolved one-dimensional, two-dimensional or even three-dimensional optical data or information. The camera may be a digital camera. As an example, the camera may comprise at least one camera chip, such as at least one CCD chip and/or at least one CMOS chip configured for recording images. The camera may be or may comprise at least one near infrared camera.

As used herein, without limitation, the term "image" specifically may relate to data recorded by using a camera, such as a plurality of electronic readings from the imaging device, such as the pixels of the camera chip. The image itself may comprise pixels, the pixels of the image correlating to pixels of the matrix of the sensor element. Consequently, when referring to "pixels", reference is either made to the units of image information generated by the single pixels of the sensor element or to the single pixels of the sensor element directly. The image may be at least one two-dimensional image. As used herein, the term "two dimensional image" may generally refer to an image having information about transversal coordinates such as the dimensions of height and width. The image may be an RGB (red green blue) image. However, other embodiments are feasible.

The camera, besides the at least one camera chip or imaging chip, may comprise further elements, such as one or more optical elements, e.g. one or more lenses. As an example, the camera may be a fix-focus camera, having at least one lens which is fixedly adjusted with respect to the camera. Alternatively, however, the camera may also comprise one or more variable lenses which may be adjusted, automatically or manually.

The camera may be a camera of a mobile device such as of notebook computers, tablets or, specifically, cell phones such as smart phones and the like. Thus, specifically, the camera may be part of a mobile device which, besides the cameras, comprises one or more data processing devices such as one or more data processors. Other cameras, however, are feasible. The term "mobile device" as used herein is a broad term and is to be given its ordinary and customary meaning to a person of ordinary skill in the art and is not to be limited to a special or customized meaning. The term specifically may refer, without limitation, to a mobile electronics device, more specifically to a mobile communication device such as a cell phone or smart phone. Additionally or alternatively, the mobile device may also refer to a tablet computer or another type of portable computer.

As used herein, the term "sensor element" may generally refer to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. The matrix specifically may be or may comprise a rectangular matrix having one or more rows and one or more columns. The rows and columns specifically may be arranged in a rectangular fashion. However, other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible.

As used herein, an "optical sensor" generally may refer to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination the at least one sensor signal is generated. The light-sensitive area may specifically be located on a surface of the respective optical sensor. Other embodiments, however, are feasible. The optical sensors of the matrix specifically may be equal in one or more of size, sensitivity and other optical, electrical and mechanical properties. The light-sensitive areas of all optical sensors of the matrix specifically may be located in a common plane, the common plane preferably facing the object, such that a light beam propagating from the object to the detector may generate a light spot on the common plane.

As used herein, the term "the optical sensors each having at least one light sensitive area" refers to configurations with a plurality of single optical sensors each having one light sensitive area and to configurations with one combined optical sensor having a plurality of light sensitive areas. Thus, the term "optical sensor" furthermore refers to a light-sensitive device configured to generate one output signal, whereas, herein, a light-sensitive device configured to generate two or more output signals, for example at least one CCD and/or CMOS device, is referred to as two or more optical sensors. Each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the detector specifically simple and efficient. Thus, as an example, commercially available photo-sensors, such as commercially available silicon photodiodes, each having precisely one sensitive area, may be used in the setup. Other embodiments, however, are feasible. Thus, as an example, an optical device comprising two, three, four or more than four light-sensitive areas may be used which is regarded as two, three, four or more than four optical sensors in the context of the present invention. As outlined above, the sensor element comprises a matrix of optical sensors. Thus, as an example, the optical sensors may be part of or constitute a pixelated optical device. As an example, the optical sensors may be part of or constitute at least one CCD and/or CMOS device having a matrix of pixels, each pixel forming a light-sensitive area.

The optical sensors specifically may be or may comprise photodetectors, preferably inorganic photodetectors, more preferably inorganic semiconductor photodetectors, most preferably silicon photodetectors. Specifically, the optical sensors may be sensitive in the infrared spectral range. All of the optical sensors of the matrix or at least a group of the optical sensors of the matrix specifically may be identical. Groups of identical optical sensors of the matrix specifically may be provided for different spectral ranges, or all optical sensors may be identical in terms of spectral sensitivity. Further, the optical sensors may be identical in size and/or with regard to their electronic or optoelectronic properties.

Specifically, the optical sensors may be or may comprise inorganic photodiodes which are sensitive in the infrared spectral range, preferably in the range of 780 nm to 3.0 micrometers. Specifically, the optical sensors may be sensitive in the part of the near infrared region where silicon photodiodes are applicable specifically in the range of 700 nm to 1000 nm. Infrared optical sensors which may be used for optical sensors may be commercially available infrared optical sensors, such as infrared optical sensors commercially available under the brand name Hertzstueck™ from trinamiX GmbH, D-67056 Ludwigshafen am Rhein, Germany. Thus, as an example, the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one bolometer, preferably a bolometer selected from the group consisting of a VO bolometer and an amorphous Si bolometer.

The matrix may be composed of independent optical sensors. Thus, a matrix may be composed of inorganic photodiodes. Alternatively, however, a commercially available matrix may be used, such as one or more of a CCD detector, such as a CCD detector chip, and/or a CMOS detector, such as a CMOS detector chip.

The optical sensors of the detector may form a sensor array or may be part of a sensor array, such as the above-mentioned matrix. Thus, as an example, the detector may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that 0.3 £ m/n £ 3, such as by choosing m/n=1:1, 4:3, 16:9 or similar. As an example, the array may be a square array, having an equal number of rows and columns, such as by choosing m=2, n=2 or m=3, n=3 or the like.

The matrix specifically may be a rectangular matrix having at least one row, preferably a plurality of rows, and a plurality of columns. As an example, the rows and columns may be oriented essentially perpendicular, wherein, with respect to the term "essentially perpendicular", reference may be made to the definition given above. Thus, as an example, tolerances of less than 20°, specifically less than 10° or even less than 5°, may be acceptable. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors, preferably at least 100 optical sensors, more preferably at least 500 optical sensors. The matrix may comprise a number of pixels in a multi-mega pixel range. Other embodiments, however, are feasible. Thus, in setups in which an axial rotational symmetry is to be expected, circular arrangements or concentric arrangements of the optical sensors of the matrix, which may also be referred to as pixels, may be preferred.

The reflection light beam may propagate from the object towards the first and second cameras. The reflection light beam may originate from the object. The projector may illuminate the object with the at least one illumination pattern and the light is remitted, reflected and/or scattered by the object and, thereby, is at least partially directed as "reflection light beams" towards the first and second cameras.

The optical sensors may be sensitive in one or more of the ultraviolet, the visible or the infrared spectral range. Specifically, the optical sensors may be sensitive in the visible spectral range from 500 nm to 780 nm, most preferably at 650 nm to 750 nm or at 690 nm to 700 nm. Specifically, the optical sensors may be sensitive in the near infrared region. Specifically, the optical sensors may be sensitive in the part of the near infrared region where silicon photodiodes are applicable specifically in the range of 700 nm to 1000 nm. The optical sensors, specifically, may be sensitive in the infrared spectral range, specifically in the range of 780 nm to 3.0 micrometers. For example, the optical sensors each, independently, may be or may comprise at least one element selected from the group consisting of a photodiode, a photocell, a photoconductor, a phototransistor or any combination thereof. For example, the optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. The photosensitive element generally may fully or partially be made of inorganic materials and/or may fully or partially be made of organic materials. Most commonly, one or more photodiodes may be used, such as commercially available photodiodes, e.g. inorganic semiconductor photodiodes.

As further used herein, a "sensor signal" generally refers to a signal generated by an optical sensor in response to the illumination by the light beam. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be configured for process or preprocess the sensor signal, thereby generating secondary sensor signals, which may also be used as sensor signals, such as preprocessing by filtering or the like.

The light beam generated by the object, also denoted as reflection light beam, specifically may fully illuminate the sensor element such that the sensor element is fully located within the light beam with a width of the light beam being larger than the matrix. Contrarily, preferably, the reflection light beam specifically may create a light spot on the entire matrix which is smaller than the matrix, such that the light spot is fully located within the matrix. This situation may easily be adjusted by a person skilled in the art of optics by choosing one or more appropriate lenses or elements having a focusing or defocusing effect on the light beam, such as by using an appropriate transfer device.

The first camera may comprise a first transfer device configured for guiding the light beam onto the first optical sensors and for forming the first reflection image on the first sensor element. The second camera may comprise a second transfer device configured for guiding the light beam onto the second optical sensors and for forming the second reflection image on the second sensor element.

The first camera is configured for imaging at least one first reflection image comprising a plurality of first reflection features generated by the object in response to illumination by the illumination features. The second camera is configured for imaging at least one second reflection image comprising a plurality of second reflection features generated by the object in response to illumination by the illumination features. As used herein, the term "reflection image" may generally refer to an image determined by the respective camera comprising a plurality of reflection features. As used herein, the term "reflection feature" may generally refer to a feature in an image plane generated by the object in response to illumination with at least one illumination feature. The reflection image may comprise the at least one reflection pattern comprising the reflection features. As used herein, the term "imaging at least one reflection image" may refer to one or more of capturing, recording and generating of the reflection image.

The first camera is arranged such that the first reflection image is imaged under a first direction of view to the object. The second camera is arranged such that the second reflection image is imaged under a second direction of view to the object. The first direction of view and the second direction of view differ.

The detector may comprise an optical axis. For example, the first transfer device may constitute a coordinate system, wherein a longitudinal coordinate z is a coordinate along an optical axis of the first transfer device. The coordinate system may be a polar coordinate system in which the optical axis of the first transfer device forms a z-axis and in which a distance from the z-axis and a polar angle may be used as additional coordinates. For example, the first transfer device may constitute a coordinate system in which the optical axis of the detector forms the z-axis and in which, additionally, an x-axis and a y-axis may be provided which are perpendicular to the z-axis and which are perpendicular to each other. As an example, the detector may rest at a specific point in this coordinate system, such as at the origin of this coordinate system. A direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate. Alternatively, other types of coordinate systems may be used. Thus, as an example, a polar coordinate system may be used in which the optical axis forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The term "direction of view to the object", also denoted as viewing direction, as used herein is a broad term and is to be given its ordinary and customary meaning to a person of ordinary skill in the art and is not to be limited to a special or customized meaning. The term specifically may refer, without limitation, to a three dimensional position and/or orientation of the respective camera in space. The direction of view may be defined by 3D coordinates of the camera such as x, y, and z. The direction of view may be defined by rotation of the camera, e.g. rotation around one or more of the x-axis, the y-axis and the z-axis. The rotation may be given by spatial angles.

The first camera and the second camera may be positioned at different spatial positions. A relative distance between the first camera and the second camera may be fixed. For example the first and the second cameras may be arranged as a stereo camera in a housing of the detector. A setup of the detector may be such that the first camera may be positioned on one side of the projector and the second camera may be positioned on an opposing side of the projector. For example, a baseline between the first camera and the projector may be shorter than a baseline between the second camera and the projector. The term "baseline" as used herein is a broad term and is to be given its ordinary and customary meaning to a person of ordinary skill in the art and is not to be limited to a special or customized meaning. The term specifically may refer, without limitation, to a relative distance between the respective camera and the projector. The baseline between the second camera and the projector may be larger than the baseline between the first camera and the projector e.g. by a factor of 4, 5 or even more. For example, the baseline between the first camera and the projector may be 4 cm or less. For example, the baseline between the first camera and the projector may be 2 cm to 4 cm.

The light-sensitive areas of the first and second cameras specifically may be oriented towards the object. As used herein, the term "is oriented towards the object" generally refers to the situation that the respective surfaces of the light-sensitive areas are fully or partially visible from the object. Specifically, at least one interconnecting line between at least one point of the object and at least one point of the respective light-sensitive area may form an angle with a surface element of the light-sensitive area which is different from 0°, such as an angle in the range of 20° to 90°, preferably 80 to 90° such as 90°. Thus, when the object is located on the optical axis or close to the optical axis, the light beam propagating from the object towards the detector may be essentially parallel to the optical axis.

For example, the first camera and the second camera have a different orientation towards the object. For example, the first sensor element may be oriented essentially perpendicular to the optical axis of the detector. The direction of view of the first camera may be essentially parallel to the optical axis of the detector. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" may refer to the condition of a parallel orientation, with a tolerance of e.g. ±20° or less, preferably a tolerance of ±10° or less, more preferably a tolerance of ±5° or less. For example, the second sensor element may be oriented deviating from an essentially perpendicular arrangement to the optical axis of the detector. The direction of view of the second camera may not be essentially parallel to the optical axis of the detector but may form an angle with the optical axis.

The evaluation device is configured for evaluating the first reflection image and the second reflection image.

The term "evaluation device" generally may refer to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations. Operations, including evaluating the images. Thus, as an example, one or more instructions may be implemented in software and/or hardware. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation. Additionally or alternatively, however, the evaluation device may also fully or partially be embodied by hardware.

The evaluation device may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement element devices for measuring electrical currents and/or electrical voltages. Further, the evaluation device may comprise one or more data storage devices. Further, the evaluation device may comprise one or more interfaces, such as one or more wireless interfaces and/or one or more wire-bound interfaces.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, Bluetooth, Wi-Fi, infrared or internet interfaces, ports or connections. It may further be connected to or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses or be integrated in an Internet of Things or Industry 4.0 type network.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices such as a 2D-camera device using an RGB-interface such as Camera-Link. The evaluation device and/or the data processing device may further be connected by one or more of inter-processor interfaces or ports, FPGA-FPGA-interfaces, or serial or parallel interfaces ports. The evaluation device and the data processing device may further be connected to one or more of an optical disc drive, a CD-RW drive, a DVD+RW drive, a flash drive, a memory card, a disk drive, a hard disk drive, a solid state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

The evaluation device may be configured for identifying and/or selecting the first reflection features in the first reflection image and the second reflection features in the second reflection image. The evaluation device may be configured for performing at least one image analysis and/or image processing for identifying and/or selecting the first reflection features and the second reflection features. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a blob detector; applying a corner detector; applying a Determinant of Hessian filter; applying a principle curvature-based region detector; applying a maximally stable extremal regions detector; applying a generalized Hough-transformation; applying a ridge detector; applying an affine invariant feature detector; applying an affine-adapted interest point operator; applying a Harris affine region detector; applying a Hessian affine region detector; applying a scale-invariant feature transform; applying a scale-space extrema detector; applying a local feature detector; applying speeded up robust features algorithm; applying a gradient location and orientation histogram algorithm; applying a histogram of oriented gradients descriptor; applying a Deriche edge detector; applying a differential edge detector; applying a spatio-temporal interest point detector; applying a Moravec corner detector; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. Specifically, the evaluation of the reflection image comprises selecting the region of interest in the reflection image. The region of interest may be determined manually by a user or may be determined automatically, such as by recognizing an object within an image generated by the sensor element. For example, in case of a spot-like reflection feature the region of interest may be selected as a region around the spot profile.

The evaluation device may be configured for performing at least one image correction. The image correction may comprise at least one background subtraction. The evaluation device may be adapted to remove influences from background light from the respective beam profile, for example, by an imaging without further illumination.

The evaluation comprises matching the first reflection features and the second reflection features. The term "matching" as used herein is a broad term and is to be given its ordinary and customary meaning to a person of ordinary skill in the art and is not to be limited to a special or customized meaning. The term specifically may refer, without limitation, to determining and/or evaluating and/or identifying corresponding first reflection features and second reflection features. The matching may comprise solving the so-called correspondence problem. As used herein, the term "corresponding reflection features" may refer to the fact that each of the first reflection features has a corresponding second reflection feature that is generated by the same illumination feature. The evaluation device may be configured for unambiguously matching the first reflection features and the second reflection features. As used herein, the term "unambiguously matching" may refer to that only one first reflection feature is assigned to one second reflection feature and/or that no other first reflection feature(s) can be assigned to the same second reflection feature and vice versa.

Each of the first and the second reflection features comprises at least one beam profile. As used herein, the term "beam profile" generally may refer to a spatial distribution, in particular in at least one plane perpendicular to the propagation of the light beam, of an intensity of the light beam. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Other embodiments are feasible, however. The beam profile may also be denoted as reflection profile.

The evaluation device may be configured for determining a longitudinal coordinate for each of the first reflection features by analysis of their respective beam profile. The analysis of the beam profile may comprise determining at least one first area and at least one second area of the beam profile. The evaluation device may be configured for deriving a combined signal Q by one or more of dividing the first area and the second area, dividing multiples of the first area and the second area, dividing linear combinations of the first area and the second area. The evaluation device may be configured for using at least one predetermined relationship between the combined signal Q and a longitudinal coordinate for determining the longitudinal coordinate.

The evaluation device is configured for determining at least one longitudinal coordinate, also denoted as $z_{DPR}$, for each of the first reflection features by analysis of their beam profiles. As used herein, the term "analysis of the beam profile" may generally refer to evaluating of the beam profile and may comprise at least one mathematical operation and/or at least one comparison and/or at least symmetrizing and/or at least one filtering and/or at least one normalizing. For example, the analysis of the beam profile may comprise at least one of a histogram analysis step, a calculation of a difference measure, application of a neural network, application of a machine learning algorithm. The evaluation device may be configured for symmetrizing and/or for normalizing and/or for filtering the beam profile, in particular to remove noise or asymmetries from recording under larger angles, recording edges or the like. The evaluation device may filter the beam profile by removing high spatial frequencies such as by spatial frequency analysis and/or median filtering or the like. Summarization may be performed by center of intensity of the light spot and averaging all intensities at the same distance to the center. The evaluation device may be configured for normalizing the beam profile to a maximum intensity, in particular to account for intensity differences due to the recorded distance. The evaluation device may be configured for removing influences from background light from the beam profile, for example, by an imaging without illumination.

The reflection feature may cover or may extend over at least one pixel of the image. For example, the reflection feature may cover or may extend over plurality of pixels. The evaluation device may be configured for determining and/or for selecting all pixels connected to and/or belonging to the reflection feature, e.g. a light spot. The evaluation device may be configured for determining the center of intensity by $$R_{coi} = \frac{1}{l \cdot \sum_j j \cdot r_{pixel}},$$

wherein $R_{coi}$ is a position of center of intensity, $r_{pixel}$ is the pixel position and $l=\Sigma_j I_{total}$ with j being the number of pixels j connected to and/or belonging to the reflection feature and $I_{total}$ being the total intensity.

The evaluation device may be configured for determining the longitudinal coordinate for each of the first reflection features by using a depth-from-photon-ratio technique, also denoted as beam profile analysis. With respect to depth-from-photon-ratio (DPR) technique reference is made to WO 2018/091649 A1, WO 2018/091638 A1, WO 2018/091640 A1 and C. Lennartz, F. Schick, S. Metz, "Whitepaper—Beam Profile Analysis for 3D imaging and material detection" Apr. 28, 2021, Ludwigshafen, Germany, the full content of which is included by reference.

The evaluation device may be configured for determining the beam profile of each of the first reflection features. As used herein, the term "determining the beam profile" refers to identifying and/or selecting at least one first reflection feature within the first reflection image and evaluating at least one intensity distribution of the first reflection feature. As an example, a region of the first reflection image may be used and evaluated for determining the intensity distribution, such as a three-dimensional intensity distribution or a two-dimensional intensity distribution, such as along an axis or line through the first reflection image. As an example, a center of illumination by the light beam may be determined, such as by determining the at least one pixel having the highest illumination, and a cross-sectional axis may be chosen through the center of illumination. The intensity distribution may an intensity distribution as a function of a coordinate along this cross-sectional axis through the center of illumination. Other evaluation algorithms are feasible.

The analysis of the beam profile of one of the first reflection features may comprise determining at least one first area and at least one second area of the beam profile. The first area of the beam profile may be an area A1 and the second area of the beam profile may be an area A2. The evaluation device may be configured for integrating the first area and the second area. The evaluation device may be configured to derive a combined signal Q, also denoted as quotient Q, by one or more of dividing the integrated first area and the integrated second area, dividing multiples of the integrated first area and the integrated second area, dividing linear combinations of the integrated first area and the integrated second area.

The evaluation device may configured for determining at least two areas of the beam profile and/or to segment the beam profile in at least two segments comprising different areas of the beam profile, wherein overlapping of the areas may be possible as long as the areas are not congruent. For example, the evaluation device may be configured for determining a plurality of areas such as two, three, four, five, or up to ten areas. The evaluation device may be configured for segmenting the light spot into at least two areas of the beam profile and/or to segment the beam profile in at least two segments comprising different areas of the beam profile. The evaluation device may be configured for determining for at least two of the areas an integral of the beam profile over the respective area. The evaluation device may be configured for comparing at least two of the determined integrals. Specifically, the evaluation device may be configured for determining at least one first area and at least one second area of the beam profile. As used herein, the term "area of the beam profile" generally refers to an arbitrary region of the beam profile at the position of the optical sensor used for determining the combined signal. The first area of the beam profile and the second area of the beam profile may be one or both of adjacent or overlapping regions. The first area of the beam profile and the second area of the beam profile may be not congruent in area. For example, the evaluation device may be configured for dividing a sensor region of the first sensor element into at least two sub-regions, wherein the evaluation device may be configured for dividing the sensor region of the first sensor element into at least one left part and at least one right part and/or at least one upper part and at least one lower part and/or at least one inner and at least one outer part. The evaluation device may be adapted to integrate the first area and the second area.

The first area of the beam profile may comprise essentially edge information of the beam profile and the second area of the beam profile comprises essentially center information of the beam profile, and/or the first area of the beam profile may comprise essentially information about a left part of the beam profile and the second area of the beam profile comprises essentially information about a right part of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably, the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region.

Other selections of the first area A1 and second area A2 may be feasible. For example, the first area may comprise essentially outer regions of the beam profile and the second area may comprise essentially inner regions of the beam profile. For example, in case of a two-dimensional beam profile, the beam profile may be divided in a left part and a right part, wherein the first area may comprise essentially areas of the left part of the beam profile and the second area may comprise essentially areas of the right part of the beam profile.

The edge information may comprise information relating to a number of photons in the first area of the beam profile and the center information may comprise information relating to a number of photons in the second area of the beam profile. The evaluation device may be configured for determining an area integral of the beam profile. The evaluation device may be configured for determining the edge information by integrating and/or summing of the first area. The evaluation device may be configured for determining the center information by integrating and/or summing of the second area. For example, the beam profile may be a trapezoid beam profile and the evaluation device may be configured for determining an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

In one embodiment, A1 may correspond to a full or complete area of a feature point. A2 may be a central area of the feature point. The central area may be a constant value. The central area may be smaller compared to the full area of the feature point. For example, in case of a circular feature point, the central area may have a radius from 0.1 to 0.9 of a full radius of the feature point, preferably from 0.4 to 0.6 of the full radius.

In one embodiment, the illumination pattern may comprise at least point pattern. A1 may correspond to an area with a full radius of a point of the point pattern on the optical sensors. A2 may be a central area of the point in the point pattern on the optical sensors. The central area may be a constant value. The central area may have a radius compared to the full radius. For example, the central area may have a radius from 0.1 to 0.9 of the full radius, preferably from 0.4 to 0.6 of the full radius.

The evaluation device may be configured to derive the quotient Q by one or more of dividing the first area and the second area, dividing multiples of the first area and the second area, dividing linear combinations of the first area and the second area. The evaluation device may be configured for deriving the quotient Q by $$Q = \frac{\iint_{A1} E(x, y)dxdy}{\iint_{A2} E(x, y)dxdy}$$

wherein x and y are transversal coordinates, A1 and A2 are the first and second area of the beam profile, respectively, and E(x,y) denotes the beam profile.

Additionally or alternatively, the evaluation device may be adapted to determine one or both of center information or edge information from at least one slice or cut of the light spot. This may be realized, for example, by replacing the area integrals in the quotient Q by a line integral along the slice or cut. For improved accuracy, several slices or cuts through the light spot may be used and averaged. In case of an elliptical spot profile, averaging over several slices or cuts may result in improved distance information.

For example, the evaluation device may be configured for evaluating the beam profile, by
    determining the pixel having the highest sensor signal and forming at least one center signal;
    evaluating sensor signals of the matrix and forming at least one sum signal;
    determining the quotient Q by combining the center signal and the sum signal; and
    determining at least one longitudinal coordinate z of the object by evaluating the quotient Q.

The sensor signal may be a signal generated by the optical sensor and/or at least one pixel of the optical sensor in response to illumination. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be adapted to process or preprocess the sensor signal, thereby generating secondary sensor signals, which may also be used as sensor signals, such as preprocessing by filtering or the like. The term "center signal" generally refers to the at least one sensor signal comprising essentially center information of the beam profile. As used herein, the term "highest sensor signal" refers to one or both of a local maximum or a maximum in a region of interest. For example, the center signal may be the signal of the pixel having the highest sensor signal out of the plurality of sensor signals generated by the pixels of the entire matrix or of a region of interest within the matrix, wherein the region of interest may be predetermined or determinable within an image generated by the pixels of the matrix. The center signal may arise from a single pixel or from a group of optical sensors, wherein, in the latter case, as an example, the sensor signals of the group of pixels may be added up, integrated or averaged, in order to determine the center signal. The group of pixels from which the center signal arises may be a group of neighboring pixels, such as pixels having less than a predetermined distance from the actual pixel having the highest sensor signal, or may be a group of pixels generating sensor signals being within a predetermined range from the highest sensor signal. The group of pixels from which the center signal arises may be chosen as large as possible in order to allow maximum dynamic range. The evaluation device may be adapted to determine the center signal by integration of the plurality of sensor signals, for example the plurality of pixels around the pixel having the highest sensor signal. For example, the beam profile may be a trapezoid beam profile and the evaluation device may be adapted to determine an integral of the trapezoid, in particular a plateau of the trapezoid.

As outlined above, the center signal generally may be a single sensor signal, such as a sensor signal from the pixel in the center of the light spot, or may be a combination of a plurality of sensor signals, such as a combination of sensor signals arising from pixels in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of pixels containing the pixel having the highest sensor signal and a predetermined group of neighboring pixels; a sum of sensor signals from a group of pixels containing the pixel having the highest sensor signal and a predetermined group of neighboring pixels; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring pixels; an integral of a group of sensor signals being within a predetermined range of tolerance from the highest sensor signal; an integral of a group of sensor signals being above a predetermined threshold.

Similarly, the term "sum signal" generally refers to a signal comprising essentially edge information of the beam profile. For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The evaluation device may be adapted to determine the sum signal by integrating signals of the entire matrix, or of the region of interest within the matrix. For example, the beam profile may be a trapezoid beam profile and the evaluation device may be adapted to determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Similarly, the center signal and edge signal may also be determined by using segments of the beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

The combined signal Q, also denoted as quotient Q, may be a signal which is generated by combining the center signal and the sum signal. Specifically, the determining may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the quotient Q may comprise an arbitrary signal or signal combination which contains at least one item of information on a comparison between the center signal and the sum signal.

As used herein, the term "longitudinal coordinate for the first reflection feature" may refer to a distance between the first camera and the object. The evaluation device may be configured for using the at least one predetermined relationship between the combined signal and the longitudinal coordinate for determining the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

The evaluation device may be configured for executing at least one depth-from-photon-ratio algorithm which computes distances for all first reflection features with zero order and higher order.

The evaluation device may configured for matching the first reflection features and the second reflection features by using the determined longitudinal coordinates.

The evaluation device may be configured for determining for each of the first reflection features a longitudinal region, wherein the longitudinal region is given by the longitudinal coordinate of the reflection feature and an error interval $\pm\epsilon$.

The evaluation device may be adapted to identify at least one second reflection feature in the second reflection image having an essentially identical longitudinal coordinate as the selected first reflection feature. The term "essentially identical" refers to identical within 10%, preferably 5%, most preferably 1%. The second reflection feature corresponding to the first reflection feature may be determined using epipolar geometry. For description of epipolar geometry reference is made, for example, to chapter 2 in X. Jiang, H. Bunke: "Dreidimensionales Computersehen" Springer, Berlin Heidelberg, 1997. Epipolar geometry may assume that the first reflection image and the second reflection image are images of the object determined at different spatial positions and/or spatial orientations having a fixed distance. The evaluation device may be adapted to determine an epipolar line in the second reflection image. The baseline of the first reflection image (of the first camera) and the second reflection image (of the second camera) may be known. For example, the relative position of the first reflection image and the second reflection image may be stored within at least one storage unit of the evaluation device. The evaluation device may be adapted to determine a straight line extending from the selected first reflection feature. The straight line may comprise possible object features corresponding to the selected first reflection feature. The straight line and the baseline span an epipolar plane. As the second reflection image is determined at a different relative position from the first reflection image, the corresponding possible object features may be imaged on a straight line, called epipolar line, in the second reflection image. Thus, a feature of the second reflection image corresponding to the selected first reflection feature lies on the epipolar line.

The evaluation device may be configured for determining at least one displacement region in the second reflection images corresponding to the longitudinal region. As used herein, the term "displacement region" refers to a region in the second reflection image in which the second reflection feature corresponding to the selected first reflection feature may be imaged. Specifically, the displacement region may be a region in the second reflection image in which the second reflection feature corresponding to the selected first reflection feature is expected to be located in the second reflection image. Depending on the distance to the object, an image position of the second reflection feature corresponding to the first reflection feature may be displaced within the second reflection image compared to an image position of the first reflection feature in the first reflection image. The displacement region may comprise only one second reflection feature. The displacement region may also comprise more than one second reflection feature. The displacement region may comprise an epipolar line or a section of an epipolar line. The displacement region may comprise more than one epipolar line or more sections of more than one epipolar line. The displacement region may extend along the epipolar line, orthogonal to an epipolar line, or both. The evaluation device may be adapted to determine the second reflection feature along the epipolar line corresponding to the distance feature and to determine an extent of the displacement region along the epipolar line corresponding to the error interval ±ε or orthogonal to an epipolar line. The measurement uncertainty of the distance estimate may result in a displacement region which is non-circular since the measurement uncertainty may be different for different directions. Specifically, the measurement uncertainty along the epipolar line or epipolar lines may be greater than the measurement uncertainty in an orthogonal direction with respect to the epipolar line or epipolar lines. The displacement region may comprise an extend in an orthogonal direction with respect to the epipolar line or epipolar lines.

The evaluation device may be configured for matching respectively one of the first reflection features with one of the second reflection features within the displacement region. The evaluation device may be configured for matching the first reflection features with the second reflection features within the respective displacement region by using at least one evaluation algorithm considering the determined longitudinal coordinate. The evaluation algorithm may be a linear scaling algorithm.

The evaluation device may be configured for determining a displacement of a matched first and second reflection features. The displacement may be a difference between an image position of the first reflection feature within the first reflection image to an image position of the second reflection feature within the second reflection image. The image position may be a pixel coordinate within the respective reflection image. The evaluation device may be configured for determining a refined longitudinal coordinate by triangulation using a predetermined relationship between a longitudinal coordinate and the displacement. Using triangulation with the second camera with a higher baseline may result in enhanced accuracy.

The predetermined relationship may be one or more of an empiric relationship, a semi-empiric relationship and an analytically derived relationship. The evaluation device may comprise at least one data storage device for storing the predetermined relationship, such as a lookup list or a lookup table. The evaluation device may be adapted to determine the pre-determined relationship by using triangulation methods. In case position of the selected first reflection feature in the first reflection image and position of the matched second reflection feature and/or relative displacement of the matched first and second reflection features is known, the refined longitudinal coordinate can determined by triangulation. Thus, the evaluation device may be adapted to select, for example subsequent and/or column by column, a first reflection feature and to determine for each potential position of the second reflection feature the corresponding distance value using triangulation. Displacement and corresponding distance value may be stored in at least one storage device of the evaluation device.

Additionally or alternatively, the evaluation device may be configured for performing the following steps:

Determining the displacement region for the image position of each first reflection feature;

Assigning an epipolar line to the displacement region of each first reflection feature such as by assigning the epipolar line closest to the displacement region and/or within the displacement region and/or closest to the displacement region along a direction orthogonal to the epipolar line;

Assigning and/or determining at least one second reflection feature to each first reflection feature such as by assigning the second reflection feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be adapted to decide between more than one epipolar line and/or second reflection features to be assigned to a first reflection feature such as by comparing distances of first reflection features and/or epipolar lines within the second reflection image and/or by comparing error weighted distances, such as ε-weighted distances of first reflection features and/or epipolar lines within the second reflection image and assigning the epipolar line and/or the second reflection feature in shorter distance and/or ε-weighted distance to the second reflection feature and/or first reflection feature.

The evaluation device is configured for determining a combined material property of matched pairs of first and second reflection features by analysis of their beam profiles. The term "combined material property" as used herein is a broad term and is to be given its ordinary and customary meaning to a person of ordinary skill in the art and is not to be limited to a special or customized meaning. The term specifically may refer, without limitation, to a material property determined by using and/or considering information from the first and the second reflection feature. The determining of the combined material property may comprise determining a material property for each of the first reflection feature and the second reflection feature and combining the determined material properties to a combined material property. This may allow reducing measurement uncertainties. The projector may project the illumination features onto the object. Both cameras may image the object with the projected illumination features. The beam profiles of the first and second reflection features can be evaluated which may allow increasing quality of the determination of the material property. The beam profile analysis may allow extracting additional material information of the object. This setup using two cameras can improve the material detection, in particular in terms of robustness. Two different views of an illumination feature on the object can yield more information of the material scattering property. By using two views, the sample size is increased by a factor of two which may allow to force a feature based material detection. A more robust material determination may be possible in due of material roughness by speckle noise, back scattered light intensity, subscattering property of materials, noise reduction by increasing the sample sizes. Using two views may be in particular advantageous for high reflecting materials such as plastic foils.

The determining of the material property of each reflection feature may be performed using beam profile analysis. Specifically, beam profile analysis makes use of reflection properties of coherent light projected onto object surfaces to classify materials. The classification of materials may be performed as described in one of WO 2020/187719, WO 2021/170791 A1 and/or WO 2021/152070, the full content of which is included by reference. Specifically, analyzing of the beam profile of each reflection feature recorded by the cameras may be performed by feature-based methods. The feature-based methods may be explained in the following. Additionally or alternatively, machine learning methods may be used. The feature based methods may be used in combination with machine learning methods which may allow parametrization of a skin classification model. Alternatively or in combination, convolutional neuronal networks may be utilized to classify skin by using the reflection images as an input.

For example, the evaluation device may be configured for identifying a reflection feature as to be generated by illuminating biological tissue, in particular human skin, in case its reflection beam profile fulfills at least one predetermined or predefined criterion. As used herein, the term "at least one predetermined or predefined criterion" refers to at least one property and/or value suitable to distinguish biological tissue, in particular human skin, from other materials. The predetermined or predefined criterion may be or may comprise at least one predetermined or predefined value and/or threshold and/or threshold range referring to a material property. The reflection feature may be indicated as to be generated by biological tissue in case the reflection beam profile fulfills the at least one predetermined or predefined criterion. The evaluation device may be configured for identifying the reflection feature as to be non-skin otherwise. As used herein, the term "biological tissue" generally refers to biological material comprising living cells. Specifically, the evaluation device may be configured for skin detection. The term "identification" of being generated by biological tissue, in particular human skin, may refer to determining and/or validating whether a surface to be examined or under test is or comprises biological tissue, in particular human skin, and/or to distinguish biological tissue, in particular human skin, from other tissues, in particular other surfaces. The present invention may allow for distinguishing human skin from one or more of inorganic tissue, metal surfaces, plastics surfaces, foam, paper, wood, a display, a screen, cloth. The present invention may allow for distinguishing human biological tissue from surfaces of artificial or non-living objects.

The reflection properties of skin may be characterized by the simultaneous occurrence of direct reflection at the surface (Lambertian-like) and subsurface scattering (volume scattering). This may lead to a broadening of the laser spot on skin compared to the above-mentioned materials. For example, without wishing to be bound by theory, the object, e.g. human skin, may have a reflection profile, also denoted back scattering profile. The reflection profile may comprise parts generated by back reflection of the surface, denoted as surface reflection, and parts generated by very diffuse reflection from light penetrating the skin, denoted as diffuse part of the back reflection. With respect to reflection profile of human skin reference is made to "Lasertechnik in der Medizin: Grundlagen, Systeme, Anwendungen", "Wirkung von Laserstrahlung auf Gewebe", 1991, pages 171 to 266, Jürgen Eichler, Theo Seiler, Springer Verlag, ISBN 0939-0979. The surface reflection of the skin may increase with the wavelength increasing towards the near infrared. Further, the penetration depth may increase with increasing wavelength from visible to near infrared. The diffuse part of the back reflection may increase with penetrating depth of the light. These properties may be used to distinguish skin from other materials, by analyzing the back scattering profile.

Specifically, the evaluation device may be configured for comparing the reflection beam profile with at least one predetermined and/or prerecorded and/or predefined beam profile. The predetermined and/or prerecorded and/or predefined beam profile may be stored in a table or a lookup table and may be determined e.g. empirically, and may, as an example, be stored in at least one data storage device of the detector. For example, the predetermined and/or prerecorded and/or predefined beam profile may be determined during initial startup of a device executing the method according to the present invention. For example, the predetermined and/or prerecorded and/or predefined beam profile may be stored in at least one data storage device of the evaluation device, e.g. by software, specifically by the app downloaded from an app store or the like. The reflection feature may be identified as to be generated by biological tissue in case the reflection beam profile and the predetermined and/or prerecorded and/or predefined beam profile are identical. The comparison may comprise overlaying the reflection beam profile and the predetermined or predefined beam profile such that their centers of intensity match. The comparison may comprise determining a deviation, e.g. a sum of squared point to point distances, between the reflection beam profile and the predetermined and/or prerecorded and/or predefined beam profile. The evaluation device may be adapted to compare the determined deviation with at least one threshold, wherein in case the determined deviation is below and/or equal the threshold the surface is indicated as biological tissue and/or the detection of biological tissue is confirmed. The threshold value may be stored in a table or a lookup table and may be determined e.g. empirically and may, as an example, be stored in at least one data storage device of the evaluation device.

Additionally or alternatively, the material property may be determined by applying at least one image filter to the image of the reflection feature. As further used herein, the term "image" refers to a two-dimensional function, f(x,y), wherein brightness and/or color values are given for any x,y-position in the image. The position may be discretized corresponding to the recording pixels. The brightness and/or color may be discretized corresponding to a bitdepth of the optical sensors. As used herein, the term "image filter" refers to at least one mathematical operation applied to the beam profile and/or to the at least one specific region of the beam profile. Specifically, the image filter $\Phi$ maps an image f, or a region of interest in the image, onto a real number, $\Phi(f(x,y))=\varphi$, wherein $\varphi$ denotes a feature, in particular a material feature. Images may be subject to noise and the same holds true for features. Therefore, features may be random variables. The features may be normally distributed. If features are not normally distributed, they may be transformed to be normally distributed such as by a Box-Cox-Transformation.

The evaluation device may be configured for determining at least one material feature $\varphi_{2m}$ by applying at least one material dependent image filter $\Phi_2$ to the image. As used herein, the term "material dependent" image filter refers to an image having a material dependent output. The output of the material dependent image filter is denoted herein "material feature $\varphi_{2m}$" or "material dependent feature $\varphi_{2m}$". The material feature may be or may comprise at least one information about the at least one material property of the surface of the scene having generated the reflection feature.

The material dependent image filter may be at least one filter selected from the group consisting of: a luminance filter; a spot shape filter; a squared norm gradient; a standard deviation; a smoothness filter such as a Gaussian filter or median filter; a grey-level-occurrence-based contrast filter; a grey-level-occurrence-based energy filter; a grey-level-occurrence-based homogeneity filter; a grey-level-occurrence-based dissimilarity filter; a Law's energy filter; a threshold area filter; or a linear combination thereof; or a further material dependent image filter $\Phi_{2other}$ which correlates to one or more of the luminance filter, the spot shape filter, the squared norm gradient, the standard deviation, the smoothness filter, the greylevel-occurrence-based energy filter, the grey-level-occurrence-based homogeneity filter, the grey-level-occurrence-based dissimilarity filter, the Law's energy filter, or the threshold area filter, or a linear combination thereof by $|\rho_{\Phi2other,\Phi m}|\geq 0.40$ with $\Phi_m$ being one of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof. The further material dependent image filter $\Phi_{2other}$ may correlate to one or more of the material dependent image filters $\Phi_m$ by $|\rho_{\Phi2other,\Phi m}|\geq 0.60$, preferably by $|\rho_{\Phi2other,\Phi m}|\geq 0.80$.

The material dependent image filter may be at least one arbitrary filter $\Phi$ that passes a hypothesis testing. As used herein, the term "passes a hypothesis testing" refers to the fact that a Null-hypothesis $H_0$ is rejected and an alternative hypothesis $H_1$ is accepted. The hypothesis testing may comprise testing the material dependency of the image filter by applying the image filter to a predefined data set. The data set may comprise a plurality of beam profile images. As used herein, the term "beam profile image" refers to a sum of $N_B$ Gaussian radial basis functions, $$f_k(x,y)=|\Sigma_{l=0}^{N_B-1}g_{lk}(x,y)|,$$

$$g_{lk}(x,y)=a_{lk}e^{-(\alpha(x-x_{lk}))^2}e^{-(\alpha(y-y_{lk}))^2}$$

wherein each of the $N_B$ Gaussian radial basis functions is defined by a center $(x_{lk},y_{lk})$, a prefactor, $a_{lk}$, and an exponential factor $\alpha=1/\epsilon$. The exponential factor is identical for all Gaussian functions in all images. The center-positions, $x_{lk}$, $y_{lk}$, are identical for all images $f_k$: $(x_0,x_1,\ldots,x_{N_{B-1}})$, $(y_0, y_1,\ldots,y_{N_{B-1}})$. Each of the beam profile images in the dataset may correspond to a material classifier and a distance. The material classifier may be a label such as 'Material A', 'Material B', etc. The beam profile images may be generated by using the above formula for $f_k(x,y)$ in combination with the following parameter table:

| Image Index | Material classifier, Material Index | Distance z | Parameters |
| --- | --- | --- | --- |
| k = 0 | Skin, m = 0 | 0.4 m | $(a_{00}, a_{10}, \ldots, a_{N_B-10})$ |
| k = 1 | Skin, m = 0 | 0.6 m | $(a_{01}, a_{11}, \ldots, a_{N_B-11})$ |
| k = 2 | Fabric, m = 1 | 0.6 m | $(a_{02}, a_{12}, \ldots, a_{N_B-12})$ |
| . | . | . | . |
| . | . | . | . |
| k = N | Material J, m = J − 1 | | $(a_{0N}, a_{1N}, \ldots, a_{N_B-1N})$ |

The values for x, y, are integers corresponding to pixels with $$\binom{x}{y} \in [0, 1, \cdots 31]^2.$$

The images may have a pixel size of 32×32. The dataset of beam profile images may be generated by using the above formula for $f_k$ in combination with a parameter set to obtain a continuous description of $f_k$. The values for each pixel in the 32×32-image may be obtained by inserting integer values from 0, ..., 31 for x, y, in $f_k(x,y)$. For example, for pixel (6,9), the value $f_k(6,9)$ may be computed.

Subsequently, for each image $f_k$, the feature value $\varphi_k$ corresponding to the filter $\Phi$ may be calculated, $\Phi(f_k(x,y), z_k)=\varphi_k$, wherein $z_k$ s a distance value corresponding to the image $f_k$ from the predefined data set. This yields a dataset with corresponding generated feature values $\varphi_k$. The hypothesis testing may use a Null-hypothesis that the filter does not distinguish between material classifier. The Null-Hypothesis may be given by $H_0$: $\mu_1=\mu_2=\ldots=\mu_j$, wherein $\mu_m$ is the expectation value of each material-group corresponding to the feature values $\varphi_k$. Index m denotes the material group. The hypothesis testing may use as alternative hypothesis that the filter does distinguish between at least two material classifiers. The alternative hypothesis may be given by $H_1$: $\exists m, m'$: $\mu_m \neq \mu_{m'}$. As used herein, the term "not distinguish between material classifiers" refers to that the expectation values of the material classifiers are identical. As used herein, the term "distinguishes material classifiers" refers to that at least two expectation values of the material classifiers differ. As used herein "distinguishes at least two material classifiers" is used synonymous to "suitable material classifier". The hypothesis testing may comprise at least one analysis of variance (ANOVA) on the generated feature values. In particular, the hypothesis testing may comprise determining a mean-value of the feature values for each of the J materials, i.e. in total J mean values $$\bar{\varphi}_m = \frac{\sum_i \varphi_{i,m}}{N_m},$$

for $m \in [0, 1, \ldots, J-1]$, wherein $N_m$ gives the number of feature values for each of the j materials in the predefined data set. The hypothesis testing may comprise determining a mean-value of all N feature values $$\bar{\varphi}_m = \frac{\sum_m \sum_i \varphi_{i,m}}{N}.$$

The hypothesis testing may comprise determining a Mean Sum Squares within:

$$mssw = (\Sigma_m \Sigma_i ((\varphi_{i,m} - \bar{\varphi}_m)^2)/(N-J).$$

The hypothesis testing may comprise determining a Mean Sum of Squares between, $$mssb = (\Sigma_m (\bar{\varphi}_m - \bar{\varphi})^2 N_m)/(J-1).$$

The hypothesis testing may comprise performing an F-Test:

- $CDF(x) = I_{\frac{d_1 x}{d_1 x + d_2}}\left(\frac{d_1}{2}, \frac{d_2}{2}\right),$ where $d_1 = N - J, d_2 = J - 1,$
- $F(x) = 1 - CDF(x)$
- $p = F(mssb/mssw)$ Herein, $I_x$ is the regularized incomplete Beta-Function, $$I_x(a, b) = \frac{B(x; a, b)}{B(a, b)},$$

with the Euler Beta-Function $B(a,b) = \int_0^1 t^{a-1}(1-t)^{b-1} dt$ and $B(x; a, b) = \int_0^x t^{a-1}(1-t)^{b-1} dt$ being the incomplete Beta-Function. The image filter may pass the hypothesis testing if a p-value, p, is smaller or equal than a pre-defined level of significance. The filter may pass the hypothesis testing if $p \leq 0.075$, preferably $p \leq 0.05$, more preferably $p \leq 0.025$, and most preferably $p \leq 0.01$. For example, in case the pre-defined level of significance is $\alpha = 0.075$, the image filter may pass the hypothesis testing if the p-value is smaller than $\alpha = 0.075$. In this case the Null-hypothesis $H_0$ can be rejected and the alternative hypothesis $H_1$ can be accepted. The image filter thus distinguishes at least two material classifiers. Thus, the image filter passes the hypothesis testing.

In the following, image filters are described assuming that the reflection image comprises at least one reflection feature, in particular a spot image. A spot image $f$ may be given by a function $f: \mathbb{R}^2 \to \mathbb{R}_{\geq 0}$, wherein the background of the image f may be already subtracted. However, other reflection features may be possible.

For example, the material dependent image filter may be a luminance filter. The luminance filter may return a luminance measure of a spot as material feature. The material feature may be determined by $$\varphi_{2m} = \Phi(f, z) = -\int f(x) dx \frac{z^2}{d_{ray} \cdot n},$$

where f is the spot image. The distance of the spot is denoted by z, where z may be obtained for example by using a depth-from-defocus or depth-from-photon ratio technique and/or by using a triangulation technique. The surface normal of the material is given by $n \in \mathbb{R}^3$ and can be obtained as the normal of the surface spanned by at least three measured points. The vector $d_{ray} \in \mathbb{R}^3$ is the direction vector of the light source. Since the position of the spot is known by using a depth-from-defocus or depth-from-photon ratio technique and/or by using a triangulation technique wherein the position of the light source is known as a parameter of the detector system, $d_{ray}$, is the difference vector between spot and light source positions.

For example, the material dependent image filter may be a filter having an output dependent on a spot shape. This material dependent image filter may return a value which correlates to the translucence of a material as material feature. The translucence of materials influences the shape of the spots. The material feature may be given by $$\varphi_{2m} = \Phi(f) = \frac{\int H(f(x) - \alpha h) dx}{\int H(f(x) - \beta h) dx},$$

wherein $0 < \alpha, \beta < 1$ are weights for the spot height h, and H denotes the Heavyside function, i.e. $H(x) = 1$: $x \geq 0$, $H(x) = 0$: $x < 0$. The spot height h may be determined by $$h = \int_{B_r} f(x) dx,$$

where $B_r$ is an inner circle of a spot with radius r.

For example, the material dependent image filter may be a squared norm gradient. This material dependent image filter may return a value which correlates to a measure of soft and hard transitions and/or roughness of a spot as material feature. The material feature may be defined by $$\varphi_{2m} = \Phi(f) = \int \|\nabla f(x)\|^2 dx.$$

For example, the material dependent image filter may be a standard deviation. The standard deviation of the spot may be determined by $$\varphi_{2m} = \Phi(f) = \omega (f(x) - \mu)^2 dx,$$

Wherein $\mu$ is the mean value given by $\mu = \int (f(x)) dx$.

For example, the material dependent image filter may be a smoothness filter such as a Gaussian filter or median filter. In one embodiment of the smoothness filter, this image filter may refer to the observation that volume scattering exhibits less speckle contrast compared to diffuse scattering materials. This image filter may quantify the smoothness of the spot corresponding to speckle contrast as material feature. The material feature may be determined by $$\varphi_{2m} = \Phi(f, z) = \frac{\int |\mathcal{F}(f)(x) - f(x)| dx}{\int f(x) dx} \cdot \frac{1}{z},$$

wherein $\mathcal{F}$ is a smoothness function, for example a median filter or Gaussian filter. This image filter may comprise dividing by the distance z, as described in the formula above. The distance z may be determined for example using a depth-from-defocus or depth-from-photon ratio technique and/or by using a triangulation technique. This may allow the filter to be insensitive to distance. In one embodiment of the smoothness filter, the smoothness filter may be based on the standard deviation of an extracted speckle noise pattern. A speckle noise pattern N can be described in an empirical way by $$f(x)=f_0(x)\cdot(N(X)+1),$$

where $f_0$ is an image of a despeckled spot. N(X) is the noise term that models the speckle pattern. The computation of a despeckled image may be difficult. Thus, the despeckled image may be approximated with a smoothed version of f, i.e. $f_0 \approx \mathcal{F}(f)$, wherein $\mathcal{F}$ is a smoothness operator like a Gaussian filter or median filter. Thus, an approximation of the speckle pattern may be given by $$N(X) = \frac{f(x)}{\mathcal{F}(f(x))} - 1.$$

The material feature of this filter may be determined by $$\varphi_{2m} = \Phi(f) = \sqrt{\text{Var}\left(\frac{f}{\mathcal{F}(f)} - 1\right)}.$$

Wherein Var denotes the variance function.

For example, the image filter may be a grey-level-occurrence-based contrast filter. This material filter may be based on the grey level occurrence matrix $M_{f,\rho}(g_1 g_2)=[p_{g1,g2}]$, whereas $p_{g1,g2}$ is the occurrence rate of the grey combination $(g_1,g_2)=[f(x_1,y_1),f(x_2,y_2)]$, and the relation $\rho$ defines the distance between $(x_1,y_1)$ and $(x_2,y_2)$, which is $\rho(x,y)=(x+a,y+b)$ with a and b selected from 0,1.

The material feature of the grey-level-occurrence-based contrast filter may be given by $$\varphi_{2m} = \Phi(f) = \sum_{i,j=0}^{N-1} p_{ij}(i-j)^2.$$

For example, the image filter may be a grey-level-occurrence-based energy filter. This material filter is based on the grey level occurrence matrix defined above.

The material feature of the grey-level-occurrence-based energy filter may be given by $$\varphi_{2m} = \Phi(f) = \sum_{i,j=0}^{N-1} (p_{ij})^2.$$

For example, the image filter may be a grey-level-occurrence-based homogeneity filter. This material filter is based on the grey level occurrence matrix defined above.

The material feature of the grey-level-occurrence-based homogeneity filter may be given by $$\varphi_{2m} = \Phi(f) = \sum_{i,j=0}^{N-1} \frac{p_{ij}}{1+|i-j|}.$$

For example, the image filter may be a grey-level-occurrence-based dissimilarity filter. This material filter is based on the grey level occurrence matrix defined above.

The material feature of the grey-level-occurrence-based dissimilarity filter may be given by $$\varphi_{2m} = \Phi(f) = -\sum_{i,j=0}^{N-1} \sqrt{p_{ij} \log(p_{ij})}.$$

For example, the image filter may be a Law's energy filter. This material filter may be based on the laws vector $L_5=[1,4,6,4,1]$ and $E_5=[-1,-2,0,-2,-1]$ and the matrices $L_5(E_5)^T$ and $E_5(L_5)^T$. The image $f_k$ is convoluted with these matrices:

$$f^*_{k,L5E5}(x, y) = \sum_{i=-2}^{2}\sum_{j=-2}^{2} f_k(x+i, y+j)L_5(E_5)^T$$

and $$f^*_{k,E5L5}(x, y) = \sum_{i=-2}^{2}\sum_{j=-2}^{2} f_k(x+i, y+j)E_5(L_5)^T.$$

$$E = \int \frac{f^*_{k,L5E5}(x, y)}{\max\left(f^*_{k,L5E5}(x, y)\right)} dxdy,$$

$$F = \int \frac{f^*_{k,E5L5}(x, y)}{\max\left(f^*_{k,E5L5}(x, y)\right)} dxdy,$$

Whereas the material feature of Law's energy filter may be determined by $$\Phi_{2m}=\Phi(f)=E/F.$$

For example, the material dependent image filter may be a threshold area filter. This material feature may relate two areas in the image plane. A first area $\Omega 1$, may be an area wherein the function f is larger than $\alpha$ times the maximum of f. A second area $\Omega 2$, may be an area wherein the function f is smaller than a times the maximum of f, but larger than a threshold value $\varepsilon$ times the maximum of f. Preferably $\alpha$ may be 0.5 and $\varepsilon$ may be 0.05. Due to speckles or noise, the areas may not simply correspond to an inner and an outer circle around the spot center. As an example, $\Omega 1$ may comprise speckles or unconnected areas in the outer circle. The material feature may be determined by $$\varphi_{2m} = \Phi(f) = \frac{\int_{\Omega 1} 1}{\int_{\Omega 2} 1},$$

wherein $\Omega 1=\{x|f(x)>\alpha\cdot\max(f(x))\}$ and $\Omega 2=\{x|\varepsilon\cdot\max(f(x))<f(x)<\alpha\cdot\max(f(x))\}$.

The evaluation device may be configured for using at least one predetermined relationship between the material feature $\phi_{2m}$ and the material property of the surface having generated the reflection feature for determining the material property of the surface having generated the reflection feature. The predetermined relationship may be one or more of an empirical relationship, a semi-empiric relationship and an analytically derived relationship. The evaluation device may comprise at least one data storage device for storing the predetermined relationship, such as a lookup list or a lookup table.

Additionally or alternatively, the material property of each of the reflection features may be performed using artificial intelligence, in particular convolutional neuronal networks. Using reflection images as input for convolutional neuronal networks may enable the generation of classification models with sufficient accuracy to differentiate between materials, e.g. between skin and other volume-scattering materials. Since only physically valid information is passed to the network by selecting important regions in the reflection image, only compact training data sets may be needed. Additionally, very compact network architectures can be generated.

Specifically, at least one parametrized classification model may be used. The parametrized classification model may be configured for classifying materials by using the reflection images as an input. The classification model may be parametrized by using one or more of machine learning, deep learning, neural networks, or other form of artificial intelligence. The term "machine-learning" as used herein is a broad term and is to be given its ordinary and customary meaning to a person of ordinary skill in the art and is not to be limited to a special or customized meaning. The term specifically may refer, without limitation, to a method of using artificial intelligence (AI) for automatically model building, in particular for parametrizing models. The term "classification model" may refer to a model configured for discriminating materials, e.g. human skin from other materials. The property characteristic for the respective material may be determined by applying an optimization algorithm in terms of at least one optimization target on the classification model. The machine learning may be based on at least one neuronal network, in particular a convolutional neural network. Weights and/or topology of the neuronal network may be pre-determined and/or pre-defined. Specifically, the training of the classification model may be performed using machine-learning. The classification model may comprise at least one machine-learning architecture and model parameters. For example, the machine-learning architecture may be or may comprise one or more of: linear regression, logistic regression, random forest, naive Bayes classifications, nearest neighbors, neural networks, convolutional neural networks, generative adversarial networks, support vector machines, or gradient boosting algorithms or the like. The term "training", also denoted learning, as used herein, is a broad term and is to be given its ordinary and customary meaning to a person of ordinary skill in the art and is not to be limited to a special or customized meaning. The term specifically may refer, without limitation, to a process of building the classification model, in particular determining and/or updating parameters of the classification model. The classification model may be at least partially data-driven. For example, the skin classification model may be based on experimental data, such as data determined by illuminating a plurality of humans and artificial objects such as masks and recording the reflection pattern. For example, the training may comprise using at least one training dataset, wherein the training data set comprises images, in particular reflection images, e.g. of a plurality of humans and artificial objects with known material property.

Additionally or alternatively, the material property may be determined using a bidirectional reflection distribution function of the matched first and second reflection features. The evaluation device may be configured for determining a bidirectional reflection distribution function of the matched first and second reflection features. The evaluation device may be configured for evaluating the bidirectional reflection distribution function thereby determining the material property. The term "bidirectional reflection distribution function (BRDF)" as used herein is a broad term and is to be given its ordinary and customary meaning to a person of ordinary skill in the art and is not to be limited to a special or customized meaning. The term specifically may refer, without limitation, to a brightness distribution depending on a viewing angle. The BRDF may be a combined beam profile determined by using two different views on the respective illumination feature. The material property can be modeled by the bidirectional reflection distribution function. As described e.g. in J. Filip et al. "BRDF Measurement of Highly-Specular Materials using a Goniometer", preprint submitted to SCCG 2017, April 2017, real-world appearance of spatially homogeneous materials can be represented by means of the BRDF. The BRDF may be described as a four-dimensional vector-valued function $f_r(\theta i, \theta_v, \phi_i, \phi_v)$ of the illumination direction $\omega_i=\{\theta, \phi_i\}$ and the viewing direction $\omega_v=\{\theta_v, \phi_v\}$ that defines how light is reflected at the surface of a material and where $\theta \in [0, \pi/2]$ is the elevation angle and $\phi \in [0, 2\pi]$ is the azimuthal angle of a spherical coordinate system. Two views of the illumination feature on the object may allow to sample the BRDF.

The evaluating of the bidirectional reflection distribution function may comprise comparing the bidirectional reflection distribution function to at least one predefined bidirectional reflection distribution function. The predefined bidirectional reflection distribution function may be stored in a table or a lookup table and may be determined e.g. empirically, and may, as an example, be stored in at least one data storage device of the evaluation device, e.g. by software, specifically by the app downloaded from an app store or the like.

The reflection feature may be identified as to be generated by a material, e.g. a biological tissue, in case the bidirectional reflection distribution function and the predefined bidirectional reflection distribution function are identical at least within tolerances. The evaluating of the bidirectional reflection distribution function may comprise comparing the bidirectional reflection distribution function to at least one predefined bidirectional reflection distribution function. The comparison may comprise overlaying the bidirectional reflection distribution function and the predefined bidirectional reflection distribution function. The comparison may comprise determining a deviation, e.g. a sum of squared point to point distances, between the bidirectional reflection distribution function and the predefined bidirectional reflection distribution function. The evaluation device may be adapted to compare the determined deviation with at least one threshold, wherein in case the determined deviation is below and/or equal the threshold the surface is indicated as a specific material, e.g. biological tissue. The threshold value may be stored in a table or a lookup table and may be determined e.g. empirically and may, as an example, be stored in at least one data storage device of the evaluation device.

The detector may be configured for auto calibration of each of the first camera and the second camera with respect to the projector and/or for auto calibration of the first camera and the second camera with respect to each other. With respect to calibration of each of the first camera and the second camera with respect to the projector reference is made to European patent application 21207250.8 filed on Nov. 9, 2021, the full content of which is included by reference.

In a further aspect of the present invention a method for determining a material property of at least one object using at least one detector for identifying at least one material property according to the present invention is disclosed. With respect to definitions and embodiments of the method reference is made to the description of the detector described in a first aspect of the present invention.

The method steps may be performed in the given order or may be performed in a different order. Further, one or more additional method steps may be present which are not listed. Further, one, more than one or even all of the method steps may be performed repeatedly.

The method comprises the following steps:
a) illuminating the object with at least one illumination pattern comprising a plurality of illumination features by using the projector;
b) imaging at least one first reflection image comprising a plurality of first reflection features generated by the object in response to illumination by the illumination features by using the first camera, wherein the first camera is arranged such that the first reflection image is imaged under a first direction of view to the object;
c) imaging at least one second reflection image comprising a plurality of second reflection features generated by the object in response to illumination by the illumination features by using the second camera, wherein the second camera is arranged such that the second reflection image is imaged under a second direction of view to the object, wherein the first direction of view and the second direction of view differ;
d) evaluating the first reflection image and the second reflection image by using the evaluation device, wherein the evaluation comprises matching the first reflection features and the second reflection features, and determining a combined material property of matched pairs of first and second reflection features by analysis of their beam profiles.

The method may be computer-implemented. The term "computer-implemented" as used herein is a broad term and is to be given its ordinary and customary meaning to a person of ordinary skill in the art and is not to be limited to a special or customized meaning. The term specifically may refer, without limitation, to a process which is fully or partially implemented by using a data processing means, such as data processing means comprising at least one processing unit.

Further disclosed and proposed herein is a computer program including computer-executable instructions for performing the method according to the present invention in one or more of the embodiments enclosed herein when the program is executed on a computer or computer network. Specifically, the computer program may be stored on a computer-readable data carrier and/or on a computer-readable storage medium.

As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one such as method step d), more than one or even all of method steps as indicated above may be performed by using a computer or a computer network, preferably by using a computer program.

Further disclosed and proposed herein is a computer program product having program code means, in order to perform the method according to the present invention in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the invention, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:
a computer or computer network comprising at least one processor, wherein the processor is adapted to perform the method according to one of the embodiments described in this description,
a computer loadable data structure that is adapted to perform the method according to one of the embodiments described in this description while the data structure is being executed on a computer,
a computer program, wherein the computer program is adapted to perform the method according to one of the embodiments described in this description while the program is being executed on a computer,
a computer program comprising program means for performing the method according to one of the embodiments described in this description while the computer program is being executed on a computer or on a computer network,
a computer program comprising program means according to the preceding embodiment, wherein the program means are stored on a storage medium readable to a computer,
a storage medium, wherein a data structure is stored on the storage medium and wherein the data structure is adapted to perform the method according to one of the embodiments described in this description after having been loaded into a main and/or working storage of a computer or of a computer network, and a computer program product having program code means, wherein the program code means can be stored or are stored on a storage medium, for performing the method according to one of the embodiments described in this description, if the program code means are executed on a computer or on a computer network.

In a further aspect a mobile device comprising at least one detector according to the present invention is disclosed. The mobile device is one or more of a mobile communication device, a tablet computer, a portable computer. With respect to definitions and embodiments of the mobile device reference is made to definitions and embodiments described with respect to the detector and method.

In a further aspect of the present invention, use of the detector according to the present invention, such as according to one or more of the embodiments given above or given in further detail below, is proposed, for a purpose of use, selected from the group consisting of: a position measurement in traffic technology; an entertainment application; a security application; a surveillance application; a safety application; a human-machine interface application; a logistics application; a tracking application; an outdoor application; a mobile application; a communication application; a photography application; a machine vision application;

a robotics application; a quality control application; a manufacturing application; a gait monitoring application; a human body monitoring application; home care; smart living, automotive application.

With respect to further uses of the detector and devices of the present invention reference is made to WO 2018/091649 A1, WO 2018/091638 A1 and WO 2018/091640 A1, the content of which is included by reference.

As used herein, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically are used only once when introducing the respective feature or element. In most cases, when referring to the respective feature or element, the expressions "at least one" or "one or more" are not repeated, nonwithstanding the fact that the respective feature or element may be present once or more than once.

Further, as used herein, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

Summarizing and without excluding further possible embodiments, the following embodiments may be envisaged:

Embodiment 1. A detector for determining at least one material property of at least one object, wherein the detector comprises
at least one projector configured for illuminating the object with at least one illumination pattern comprising a plurality of illumination features;
at least one first camera having at least one first sensor element, wherein the first sensor element has a matrix of first optical sensors, the first optical sensors each having a light-sensitive area, wherein each first optical sensor is designed to generate at least one sensor signal in response to an illumination of its respective light-sensitive area by a reflection light beam propagating from the object to the first camera, wherein the first camera is configured for imaging at least one first reflection image comprising a plurality of first reflection features generated by the object in response to illumination by the illumination features, wherein the first camera is arranged such that the first reflection image is imaged under a first direction of view to the object;
at least one second camera having at least one second sensor element, wherein the second sensor element has a matrix of second optical sensors, the second optical sensors each having a light-sensitive area, wherein each second optical sensor is designed to generate at least one sensor signal in response to an illumination of its respective light-sensitive area by a reflection light beam propagating from the object to the second camera, wherein the second camera is configured for imaging at least one second reflection image comprising a plurality of second reflection features generated by the object in response to illumination by the illumination features, wherein the second camera is arranged such that the second reflection image is imaged under a second direction of view to the object, wherein the first direction of view and the second direction of view differ;
at least one evaluation device configured for evaluating the first reflection image and the second reflection image, wherein the evaluation comprises matching the first reflection features and the second reflection features and determining a combined material property of matched pairs of first and second reflection features by analysis of their beam profiles.

Embodiment 2. The detector according to the preceding embodiment, wherein a baseline between the first camera and the projector is shorter than a baseline between the second camera and the projector.

Embodiment 3. The detector according to any one of the preceding embodiments, wherein the evaluation device is configured for determining a bidirectional reflection distribution function of the matched pairs of first and second reflection features, wherein the evaluation device is configured for evaluating the bidirectional reflection distribution function thereby determining the combined material property.

Embodiment 4. The detector according to the preceding embodiment, wherein the evaluating of the bidirectional reflection distribution function comprises comparing the bidirectional reflection distribution function to at least one predefined bidirectional reflection distribution function.

Embodiment 5. The detector according to any one of the preceding embodiments, wherein the evaluation device is configured for determining a first material property by analysis of the beam profile of the first reflection feature and a second material property by analysis of the beam profile of the second reflection feature, wherein the evaluation device is configured for combining the first material property and the second material property for determining the combined material property.

Embodiment 6. The detector according to any one of the preceding embodiments, wherein the illumination pattern comprises at least 4000 illumination features.

Embodiment 7. The detector according to any one of the preceding embodiments, wherein the projector comprises at least one emitter and/or at least one array of emitters, wherein each of the emitters is and/or comprises at least one element selected from the group consisting of at least one laser source such as at least one semi-conductor laser, at least one double heterostructure laser, at least one external cavity laser, at least one separate confinement heterostructure laser, at least one quantum cascade laser, at least one distributed Bragg reflector laser, at least one polariton laser, at least one hybrid silicon laser, at least one extended cavity diode laser, at least one quantum dot laser, at least one volume Bragg grating laser, at least one Indium Arsenide laser, at least one Gallium Arsenide laser, at least one transistor laser, at least one diode pumped laser, at least one distributed feedback lasers, at least one quantum well laser, at least one interband cascade laser, at least one semiconductor ring laser, at least one vertical cavity surface-emitting laser; at least one non-laser light source such as at least one LED or at least one light bulb.

Embodiment 8. The detector according to any one of the preceding embodiments, wherein the first camera comprises at least one CCD sensor or at least one CMOS sensor, wherein the second camera comprises at least one CCD sensor or at least one CMOS sensor.

Embodiment 9. The detector according to any one of the preceding embodiments, wherein the evaluation device is configured for determining a longitudinal coordinate for each of the first reflection features by analysis of their respective beam profile.

Embodiment 10. The detector according to the preceding embodiment, wherein the analysis of the beam profile comprises determining at least one first area and at least one second area of the beam profile, wherein the evaluation device is configured for deriving a combined signal Q by one or more of dividing the first area and the second area, dividing multiples of the first area and the second area, dividing linear combinations of the first area and the second area, wherein the evaluation device is configured for using at least one predetermined relationship between the combined signal Q and a longitudinal coordinate for determining the longitudinal coordinate.

Embodiment 11. The detector according to any one of the two preceding embodiments, wherein the evaluation device is configured for matching the first reflection features and the second reflection features by using the determined longitudinal coordinates, wherein the evaluation device is configured for determining for each of the first reflection features a longitudinal region, wherein the longitudinal region is given by the longitudinal coordinate of the reflection feature and an error interval ±ε, wherein the evaluation device is configured for determining at least one displacement region in the second reflection images corresponding to the longitudinal region.

Embodiment 12. The detector according to the preceding embodiment, wherein the evaluation device is configured for matching respectively one of the first reflection features with one of the second reflection features within the displacement region.

Embodiment 13. The detector according to any one of the preceding embodiments, wherein the evaluation device is configured for determining a displacement of a matched first and second reflection features, wherein the displacement is a difference between an image position of the first reflection feature within the first reflection image to an image position of the second reflection feature within the second reflection image, wherein the evaluation device is configured for determining a refined longitudinal coordinate by triangulation using a predetermined relationship between a longitudinal coordinate and the displacement.

Embodiment 14. The detector according to any one of the preceding embodiments, wherein the detector is configured for auto calibration of each of the first and the second camera with respect to the projector and/or for auto calibration of the first camera and the second camera with respect to each other.

Embodiment 15. A method for determining a material property of at least one object using at least one detector for identifying at least one material property according to any one of the preceding embodiments, wherein the method comprises the following steps:
a) illuminating the object with at least one illumination pattern comprising a plurality of illumination features by using the projector;
b) imaging at least one first reflection image comprising a plurality of first reflection features generated by the object in response to illumination by the illumination features by using the first camera, wherein the first camera is arranged such that the first reflection image is imaged under a first direction of view to the object;
c) imaging at least one second reflection image comprising a plurality of second reflection features generated by the object in response to illumination by the illumination features by using the second camera, wherein the second camera is arranged such that the second reflection image is imaged under a second direction of view to the object, wherein the first direction of view and the second direction of view differ;
d) evaluating the first reflection image and the second reflection image by using the evaluation device, wherein the evaluation comprises matching the first reflection features and the second reflection features, and determining a combined material property of matched pairs of first and second reflection features by analysis of their beam profiles.

Embodiment 16. A computer program comprising instructions which, when the program is executed by the detector according to any one of the preceding embodiments referring to a detector, cause the detector to perform the method according to any one of the preceding embodiments referring to a method.

Embodiment 17. A computer-readable storage medium comprising instructions which, when the instructions are executed by the detector according to any one of the preceding embodiments referring to a detector, cause the detector to perform the method according to any one of the preceding embodiments referring to a method.

Embodiment 18. A mobile device comprising at least one detector according to any one of the preceding embodiments referring to a detector, wherein the mobile device is one or more of a mobile communication device, a tablet computer, a portable computer.

Embodiment 19. A use of the detector according to any one of the preceding embodiments referring to a detector, for a purpose of use, selected from the group consisting of: a position measurement in traffic technology; an entertainment application; a security application; a surveillance application; a safety application; a human-machine interface application; a logistics application; a tracking application; an outdoor application; a mobile application; a communication application; a photography application; a machine vision application; a robotics application; a quality control application; a manufacturing application; a gait monitoring application; a human body monitoring application; home care; smart living, automotive application.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

Figure 2:
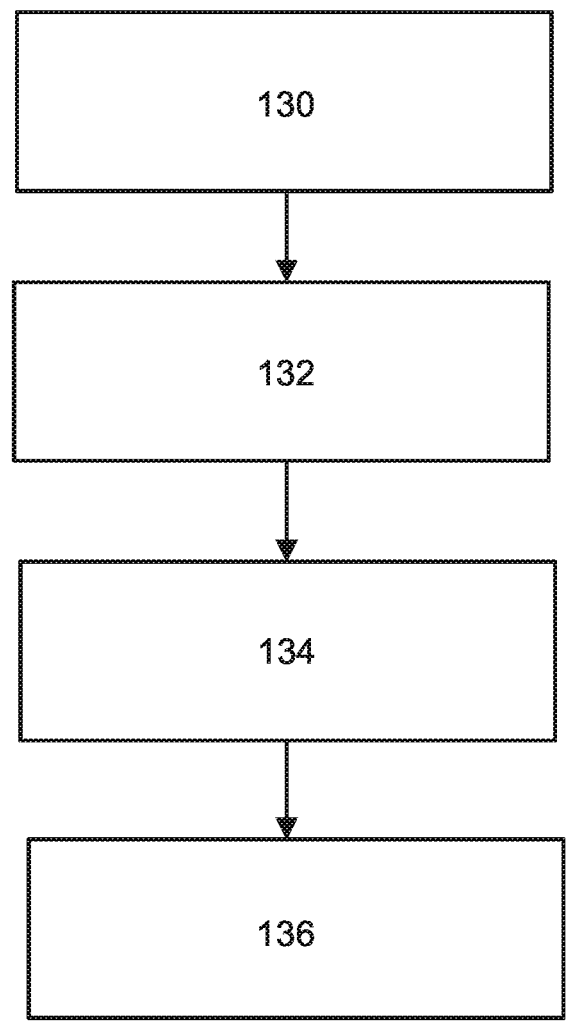

In the Figures:

FIG. 1 shows an embodiment of a detector and a mobile device according to the present invention; and FIG. 2 shows an embodiment of the method for determining at least one material property according to the present invention.

DETAILED DESCRIPTION OF THE EMBODIMENTS

FIG. 1 shows in a highly schematic fashion an embodiment of a detector 110 for determining at least one material property of at least one object 112 and a mobile device 114 according to the present invention. The detector 110 may be one of attached to or integrated into the mobile device 114 such as a mobile phone or smartphone. The detector 110 may be integrated in the mobile device 114, e.g. within a housing of the mobile device.

For example, the object 112 may be at least one object selected from the group consisting of: a scene, a human such as a human, wood, carpet, foam, an animal such as a cow, a plant, a piece of tissue, a metal, a toy, a metallic object, a beverage, a food such as a fruit, meat, fish, a dish, a cosmetics product, an applied cosmetics product, cloth, fur, hair, a maintenance product, a cream, an oil, a powder, a carpet, a juice, a suspension, a paint, a plant, a body, a part of a body, organic material, inorganic material, a reflective material, a screen, a display, a wall, a sheet of paper, such as photograph.

For example, the material property may be a property selected from the group consisting of: roughness, penetration depth of light into the material, a property characterizing the material as biological or non-biological material, a reflectivity, a specular reflectivity, a diffuse reflectivity, a surface property, a measure for translucence, a scattering, specifically a back-scattering behavior or the like. The at least one material property may be a property selected from the group consisting of: a scattering coefficient, a translucency, a transparency, a deviation from a Lambertian surface reflection, a speckle, and the like.

The determining at least one material property may comprise one or more of identifying, characterizing, and assigning the material property to the object 112. The detector 110 may comprise at least one database comprising a list and/or table, such as a lookup list or a lookup table, of predefined and/or predetermined material properties. The list and/or table of material properties may be determined and/or generated by performing at least one test measurement using the detector, for example by performing material tests using samples having known material properties. The list and/or table of material properties may be determined and/or generated at the manufacturer site and/or by the user of the detector. The material property may additionally be assigned to a material classifier such as one or more of a material name, a material group such as biological or non-biological material, translucent or non-translucent materials, metal or non-metal, skin or non-skin, fur or non-fur, carpet or non-carpet, reflective or non-reflective, specular reflective or non-specular reflective, foam or non-foam, hair or non-hair, roughness groups or the like. The detector 110 may comprise at least one database comprising a list and/or table comprising the material properties and associated material name and/or material group.

The detector 110 comprises at least one projector 116 configured for illuminating the object 112 with at least one illumination pattern 118 comprising a plurality of illumination features 120;

at least one first camera 122 having at least one first sensor element, wherein the first sensor element has a matrix of first optical sensors, the first optical sensors each having a light-sensitive area, wherein each first optical sensor is designed to generate at least one sensor signal in response to an illumination of its respective light-sensitive area by a reflection light beam propagating from the object 112 to the first camera 122, wherein the first camera is configured for imaging at least one first reflection image comprising a plurality of first reflection features generated by the object 112 in response to illumination by the illumination features, wherein the first camera 122 is arranged such that the first reflection image is imaged under a first direction of view to the object 112;

at least one second camera 124 having at least one second sensor element, wherein the second sensor element has a matrix of second optical sensors, the second optical sensors each having a light-sensitive area, wherein each second optical sensor is designed to generate at least one sensor signal in response to an illumination of its respective light-sensitive area by a reflection light beam propagating from the object 112 to the second camera 124, wherein the second camera is configured for imaging at least one second reflection image comprising a plurality of second reflection features generated by the object 112 in response to illumination by the illumination features, wherein the second camera 124 is arranged such that the second reflection image is imaged under a second direction of view to the object 112, wherein the first direction of view and the second direction of view differ;

at least one evaluation device 126 configured for evaluating the first reflection image and the second reflection image, wherein the evaluation comprises matching the first reflection features and the second reflection features and determining a combined material property of matched pairs of first and second reflection features by analysis of their beam profiles.

The projector 116 may be an optical device configured to project the at least one illumination pattern 118 onto the object 112, specifically onto a surface of the object 112. The illumination feature 120 may be at least one at least partially extended feature of the illumination pattern 118. The illumination pattern 118 comprises a plurality of illumination features 120. For example, the illumination pattern 118 comprises at least 4000 illumination features 120 or even more.

The illumination pattern 118 may be a regular, in particular periodic pattern. However, other non-regular patterns may be possible, too. The illumination pattern 118 may comprise at least one pattern selected from the group consisting of: at least one quasi random pattern; at least one Sobol pattern; at least one quasiperiodic pattern; at least one point pattern, in particular a pseudo-random point pattern; at least one line pattern; at least one stripe pattern; at least one checkerboard pattern; at least one triangular pattern; at least one rectangular pattern; at least one hexagonal pattern or a pattern comprising further convex tilings. The illumination pattern 118 may exhibit the at least one illumination feature 120 selected from the group consisting of: at least one point; at least one line; at least two lines such as parallel or crossing lines; at least one point and one line; at least one arrangement of periodic features; at least one arbitrary shaped featured pattern. For example, the illumination pattern 118 comprises at least one pattern comprising at least one pre-known feature. For example, the illumination pattern 118 comprises at least one line pattern comprising at least one line. For example, the illumination pattern 118 comprises at least one line pattern comprising at least two lines such as parallel or crossing lines. For example, the projector 116 may be configured for generate and/or to project a cloud of points or non-point-like features. For example, the projector 116 may be configured for generate a cloud of points or non-point-like features such that the illumination pattern 118 may comprise a plurality of point features or non-point-like features.

The projector 116 may comprise at least one emitter and/or at least one array of emitters. Each of the emitters may be configured for emitting at least one light beam. Each of the emitters may be and/or may comprise at least one element selected from the group consisting of at least one laser source such as at least one semi-conductor laser, at least one double heterostructure laser, at least one external cavity laser, at least one separate confinement heterostructure laser, at least one quantum cascade laser, at least one distributed Bragg reflector laser, at least one polariton laser, at least one hybrid silicon laser, at least one extended cavity diode laser, at least one quantum dot laser, at least one volume Bragg grating laser, at least one Indium Arsenide laser, at least one Gallium Arsenide laser, at least one transistor laser, at least one diode pumped laser, at least one distributed feedback lasers, at least one quantum well laser, at least one interband cascade laser, at least one semiconductor ring laser, at least one vertical cavity surface-emitting laser (VCSEL); at least one non-laser light source such as at least one LED or at least one light bulb. For example, the emitters may be an array of VCSELs. The term "vertical-cavity surface-emitting laser" as used herein is a broad term and is to be given its ordinary and customary meaning to a person of ordinary skill in the art and is not to be limited to a special or customized meaning. The term specifically may refer, without limitation, to a semiconductor laser diode configured for laser beam emission perpendicular with respect to a top surface. Examples for VCSELs can be found e.g. in en.wikipedia.org/wiki/Vertical-cavity_surface-emitting_laser. VCSELs are generally known to the skilled person such as from WO 2017/222618 A.

Each of the VCSELs is configured for generating at least one light beam. The VCSELs may be arranged on a common substrate or on different substrates. The array may comprise up to 2500 VCSELs. For example, the array may comprise 38×25 VCSELs, such as a high power array with 3.5 W. For example, the array may comprise 10×27 VCSELs with 2.5 W. For example, the array may comprise 96 VCSELs with 0.9 W. A size of the array, e.g. of 2500 elements, may be up to 2 mm×2 mm.

The light beam emitted by the respective emitter may have a wavelength of 300 to 1100 nm, preferably 500 to 1100 nm. For example, the light beam may have a wavelength of 940 nm. For example, light in the infrared spectral range may be used, such as in the range of 780 nm to 3.0 μm. Specifically, the light in the part of the near infrared region where silicon photodiodes are applicable specifically in the range of 700 nm to 1100 nm may be used. The emitters may be configured for generating the at least one illumination pattern in the infrared region, in particular in the near infrared region. Using light in the near infrared region may allow that light is not or only weakly detected by human eyes and is still detectable by silicon sensors, in particular standard silicon sensors. For example, the emitters may be an array of VCSELs. The VCSELs may be configured for emitting light beams at a wavelength range from 800 to 1000 nm. For example, the VCSELs may be configured for emitting light beams at 808 nm, 850 nm, 940 nm, or 980 nm. Preferably the VCSELs emit light at 940 nm, since terrestrial sun radiation has a local minimum in irradiance at this wavelength, e.g. as described in CIE 085-1989 "Solar spectral Irradiance".

The projector 116 may comprises at least one transfer device, not shown in the Figures, configured for generating the illumination features 120 from the light beams impinging on the transfer device. The transfer device may comprise at least one imaging optical device. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system; at least one holographic optical element; at least one meta optical element. Specifically, the transfer device comprises at least one refractive optical lens stack. Thus, the transfer device may comprise a multi-lens system having refractive properties. The projector 116 may comprise at least one diffractive optical element (DOE) configured for generating the illumination pattern 118. The DOE may be configured for generating multiple light beams from a single incoming light beam.

The object 112 may comprise at least one surface on which the illumination pattern 118 is projected. The surface may be adapted to at least partially reflect the illumination pattern 118 back towards the detector. For example, without wishing to be bound by this theory, human skin may have a reflection profile, also denoted back scattering profile, comprising parts generated by back reflection of the surface, denoted as surface reflection, and parts generated by very diffuse reflection from light penetrating the skin, denoted as diffuse part of the back reflection. With respect to reflection profile of human skin reference is made to "Lasertechnik in der Medizin: Grundlagen, Systeme, Anwendungen", "Wirkung von Laserstrahlung auf Gewebe", 1991, pages 171 to 266, Jurgen Eichler, Theo Seiler, Springer Verlag, ISBN 0939-0979. The surface reflection of the skin may increase with the wavelength increasing towards the near infrared. Further, the penetration depth may increase with increasing wavelength from visible to near infrared. The diffuse part of the back reflection may increase with penetrating depth of the light. These material properties may be used to distinguish skin from other materials, specifically by analyzing the back scattering profile.

The first camera 122 may comprise at least one CCD sensor or at least one CMOS sensor. The second camera 124 may comprise at least one CCD sensor or at least one CMOS sensor.

The first and second cameras 122, 124 may be designed identical or different. For example, the first and second cameras 122, 124 may have identical or different resolutions.

The first camera 122 is configured for imaging at least one first reflection image comprising a plurality of first reflection features generated by the object 112 in response to illumination by the illumination features 120. The second camera 124 is configured for imaging at least one second reflection image comprising a plurality of second reflection features generated by the object 112 in response to illumination by the illumination features 120. The reflection image may be an image determined by the respective camera comprising a plurality of reflection features. The reflection feature may be a feature in an image plane generated by the object 112 in response to illumination with at least one illumination feature 118. The reflection image may comprise the at least one reflection pattern comprising the reflection features. The imaging at least one reflection image may comprise one or more of capturing, recording and generating of the reflection image.

The first camera 122 is arranged such that the first reflection image is imaged under a first direction of view to the object 112. The second camera 124 is arranged such that the second reflection image is imaged under a second direction of view to the object 112. The first direction of view and the second direction of view differ.

The direction of view to the object, also denoted as viewing direction, may be defined by a three dimensional position and/or orientation of the respective camera 122, 124 in space. The direction of view may be defined by 3D coordinates of the camera 122, 124 such as x, y, and z. The direction of view may be defined by rotation of the camera 122, 124, e.g. rotation around one or more of the x-axis, the y-axis and the z-axis. The rotation may be given by spatial angles.

The first camera 122 and the second camera 124 may be positioned at different spatial positions. A relative distance between the first camera 122 and the second camera 124 may be fixed. For example the first and the second cameras 122, 124 may be arranged as a stereo camera in a housing of the detector. As shown in FIG. 1, a setup of the detector 110 may be such that the first camera 122 may be positioned on one side of the projector 116 and the second camera 124 may be positioned on an opposing side of the projector 116. For example, a baseline between the first camera 122 and the projector 116 may be shorter than a baseline between the second camera 124 and the projector 116. The baseline between the second camera 124 and the projector 116 may be larger than the baseline between the first camera 122 and the projector 116 e.g. by a factor of 4, 5 or even more. For example, the baseline between the first camera 122 and the projector 116 may be 4 cm or less.

As shown in FIG. 1, the first camera 122 and the second camera 124 may have a different orientation towards the object 112. For example, the first sensor element may be oriented essentially perpendicular to the optical axis of the detector 110. The direction of view of the first camera 122 may be essentially parallel to the optical axis of the detector 110. The second sensor element may be oriented deviating from an essentially perpendicular arrangement to the optical axis of the detector 110. The direction of view of the second camera 124 may not be essentially parallel to the optical axis of the detector 110 but may form an angle with the optical axis.

The evaluation device 126 is configured for evaluating the first reflection image and the second reflection image.

The evaluation device 126 may be configured for identifying and/or selecting the first reflection features in the first reflection image and the second reflection features in the second reflection image. The evaluation device 126 may be configured for performing at least one image analysis and/or image processing for identifying and/or selecting the first reflection features and the second reflection features. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a blob detector; applying a corner detector; applying a Determinant of Hessian filter; applying a principle curvature-based region detector; applying a maximally stable extremal regions detector; applying a generalized Hough-transformation; applying a ridge detector; applying an affine invariant feature detector; applying an affine-adapted interest point operator; applying a Harris affine region detector; applying a Hessian affine region detector; applying a scale-invariant feature transform; applying a scale-space extrema detector; applying a local feature detector; applying speeded up robust features algorithm; applying a gradient location and orientation histogram algorithm; applying a histogram of oriented gradients descriptor; applying a Deriche edge detector; applying a differential edge detector; applying a spatio-temporal interest point detector; applying a Moravec corner detector; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. Specifically, the evaluation of the reflection image comprises selecting the region of interest in the reflection image. The region of interest may be determined manually by a user or may be determined automatically, such as by recognizing an object within an image generated by the sensor element. For example, in case of a spot-like reflection feature the region of interest may be selected as a region around the spot profile.

The evaluation device 126 may be configured for performing at least one image correction. The image correction may comprise at least one background subtraction. The evaluation device 126 may be adapted to remove influences from background light from the respective beam profile, for example, by an imaging without further illumination.

The evaluation comprises matching the first reflection features and the second reflection features. The matching may comprise determining and/or evaluating and/or identifying corresponding first reflection features and second reflection features. The matching may comprise solving the so-called correspondence problem. The evaluation device 126 may be configured for unambiguously matching the first reflection features and the second reflection features.

Each of the first and the second reflection features comprises at least one beam profile. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Other embodiments are feasible, however. The beam profile may also be denoted as reflection profile.

The evaluation device 126 may be configured for determining a longitudinal coordinate for each of the first reflection features by analysis of their respective beam profile. The analysis of the beam profile may comprise determining at least one first area and at least one second area of the beam profile. The evaluation device 126 may be configured for deriving a combined signal Q by one or more of dividing the first area and the second area, dividing multiples of the first area and the second area, dividing linear combinations of the first area and the second area. The evaluation device may be configured for using at least one predetermined relationship between the combined signal Q and a longitudinal coordinate for determining the longitudinal coordinate.

The evaluation device 126 is configured for determining at least one longitudinal coordinate, also denoted as $z_{DPR}$, for each of the first reflection features by analysis of their beam profiles. The analysis of the beam profile may comprise at least one mathematical operation and/or at least one comparison and/or at least one symmetrizing and/or at least one filtering and/or at least one normalizing. For example, the analysis of the beam profile may comprise at least one of a histogram analysis step, a calculation of a difference measure, application of a neural network, application of a machine learning algorithm. The evaluation device 126 may be configured for symmetrizing and/or for normalizing and/or for filtering the beam profile, in particular to remove noise or asymmetries from recording under larger angles, recording edges or the like. The evaluation device 126 may filter the beam profile by removing high spatial frequencies such as by spatial frequency analysis and/or median filtering or the like. Summarization may be performed by center of intensity of the light spot and averaging all intensities at the same distance to the center. The evaluation device 126 may be configured for normalizing the beam profile to a maximum intensity, in particular to account for intensity differences due to the recorded distance. The evaluation device 126 may be configured for removing influences from background light from the beam profile, for example, by an imaging without illumination.

The evaluation device 126 may be configured for determining the longitudinal coordinate for each of the first reflection features by using a depth-from-photon-ratio technique, also denoted as beam profile analysis. With respect to depth-from-photon-ratio (DPR) technique reference is made to WO 2018/091649 A1, WO 2018/091638 A1, WO 2018/091640 A1 and C. Lennartz, F. Schick, S. Metz, "Whitepaper—Beam Profile Analysis for 3D imaging and material detection" Apr. 28, 2021, Ludwigshafen, Germany, the full content of which is included by reference.

The longitudinal coordinate for the first reflection feature may be a distance between the first camera 122 and the object 112. The evaluation device 126 may be configured for using the at least one predetermined relationship between the combined signal and the longitudinal coordinate for determining the longitudinal coordinate. The predetermined relationship may be one or more of an empiric relationship, a semi-empiric relationship and an analytically derived relationship. The evaluation device 126 may comprise at least one data storage device for storing the predetermined relationship, such as a lookup list or a lookup table. The evaluation device 126 may be configured for executing at least one depth-from-photon-ratio algorithm which computes distances for all first reflection features with zero order and higher order.

The evaluation device 126 may configured for matching the first reflection features and the second reflection features by using the determined longitudinal coordinates.

The evaluation device 126 may be configured for determining for each of the first reflection features a longitudinal region, wherein the longitudinal region is given by the longitudinal coordinate of the reflection feature and an error interval ±ε.

The evaluation device 126 may be adapted to identify at least one second reflection feature in the second reflection image having an essentially identical longitudinal coordinate as the selected first reflection feature. The second reflection feature corresponding to the first reflection feature may be determined using epipolar geometry. For description of epipolar geometry reference is made, for example, to chapter 2 in X. Jiang, H. Bunke: "Dreidimensionales Computersehen" Springer, Berlin Heidelberg, 1997. Epipolar geometry may assume that the first reflection image and the second reflection image are images of the object determined at different spatial positions and/or spatial orientations having a fixed distance. The evaluation device 126 may be adapted to determine an epipolar line in the second reflection image. The baseline of the first reflection image (of the first camera) and the second reflection image (of the second camera) may be known. For example, the relative position of the first reflection image and the second reflection image may be stored within at least one storage unit of the evaluation device 126. The evaluation device 126 may be adapted to determine a straight line extending from the selected first reflection feature. The straight line may comprise possible object features corresponding to the selected first reflection feature. The straight line and the baseline span an epipolar plane. As the second reflection image is determined at a different relative position from the first reflection image, the corresponding possible object features may be imaged on a straight line, called epipolar line, in the second reflection image. Thus, a feature of the second reflection image corresponding to the selected first reflection feature lies on the epipolar line.

The evaluation device 126 may be configured for determining at least one displacement region in the second reflection images corresponding to the longitudinal region. Specifically, the displacement region may be a region in the second reflection image in which the second reflection feature corresponding to the selected first reflection feature is expected to be located in the second reflection image. Depending on the distance to the object 112, an image position of the second reflection feature corresponding to the first reflection feature may be displaced within the second reflection image compared to an image position of the first reflection feature in the first reflection image. The displacement region may comprise only one second reflection feature. The displacement region may also comprise more than one second reflection feature. The displacement region may comprise an epipolar line or a section of an epipolar line. The displacement region may comprise more than one epipolar line or more sections of more than one epipolar line. The displacement region may extend along the epipolar line, orthogonal to an epipolar line, or both. The evaluation device 126 may be adapted to determine the second reflection feature along the epipolar line corresponding to the distance feature and to determine an extent of the displacement region along the epipolar line corresponding to the error interval $\pm\varepsilon$ or orthogonal to an epipolar line. The measurement uncertainty of the distance estimate may result in a displacement region which is non-circular since the measurement uncertainty may be different for different directions. Specifically, the measurement uncertainty along the epipolar line or epipolar lines may be greater than the measurement uncertainty in an orthogonal direction with respect to the epipolar line or epipolar lines. The displacement region may comprise an extend in an orthogonal direction with respect to the epipolar line or epipolar lines.

The evaluation device 126 may be configured for matching respectively one of the first reflection features with one of the second reflection features within the displacement region. The evaluation device 126 may be configured for matching the first reflection features with the second reflection features within the respective displacement region by using at least one evaluation algorithm considering the determined longitudinal coordinate. The evaluation algorithm may be a linear scaling algorithm.

The evaluation device 126 may be configured for determining a displacement of a matched first and second reflection features. The displacement may be a difference between an image position of the first reflection feature within the first reflection image to an image position of the second reflection feature within the second reflection image. The image position may be a pixel coordinate within the respective reflection image. The evaluation device 126 may be configured for determining a refined longitudinal coordinate by triangulation using a predetermined relationship between a longitudinal coordinate and the displacement. Using triangulation with the second camera with a higher baseline may result in enhanced accuracy. The predetermined relationship may be one or more of an empiric relationship, a semi-empiric relationship and an analytically derived relationship. The evaluation device 126 may comprise at least one data storage device for storing the predetermined relationship, such as a lookup list or a lookup table. The evaluation device 126 may be adapted to determine the pre-determined relationship by using triangulation methods. In case position of the selected first reflection feature in the first reflection image and position of the matched second reflection feature and/or relative displacement of the matched first and second reflection features is known, the refined longitudinal coordinate can determined by triangulation. Thus, the evaluation device 126 may be adapted to select, for example subsequent and/or column by column, a first reflection feature and to determine for each potential position of the second reflection feature the corresponding distance value using triangulation. Displacement and corresponding distance value may be stored in at least one storage device of the evaluation device 126.

The evaluation device 126 is configured for determining a combined material property of matched pairs of first and second reflection features by analysis of their beam profiles. The combined material property may be a material property determined by using and/or considering information from the first and the second reflection feature. The determining of the combined material property may comprise determining a material property for each of the first reflection feature and the second reflection feature and combining the determined material properties to a combined material property. This may allow reducing measurement uncertainties. The projector 116 may project the illumination features 120 onto the object 112. Both cameras 122, 124 may image the object 112 with the projected illumination features 118. The beam profiles of the first and second reflection features can be evaluated which may allow increasing quality of the determination of the material property. The beam profile analysis may allow extracting additional material information of the object 112. This setup using two cameras 122, 124 can improve the material detection, in particular in terms of robustness. Two different views of an illumination feature on the object 112 can yield more information of the material scattering property. By using two views, the sample size is increased by a factor of two which may allow to force a feature based material detection. A more robust material determination may be possible in due of material roughness by speckle noise, back scattered light intensity, subscattering property of materials, noise reduction by increasing the sample sizes. Using two views may be in particular advantageous for high reflecting materials such as plastic foils.

The determining of the material property of each reflection feature may be performed using beam profile analysis. Specifically, beam profile analysis makes use of reflection properties of coherent light projected onto object surfaces to classify materials. The classification of materials may be performed as described in one of WO 2020/187719, WO 2021/170791 A1 and/or WO 2021/152070, the full content of which is included by reference. Specifically, analyzing of the beam profile of each reflection feature recorded by the cameras may be performed by feature-based methods. Additionally or alternatively, machine learning methods may be used. The feature based methods may be used in combination with machine learning methods which may allow parametrization of a skin classification model. Alternatively or in combination, convolutional neuronal networks may be utilized to classify skin by using the reflection images as an input.

Additionally or alternatively, the material property may be determined using a bidirectional reflection distribution function 128 of the matched first and second reflection features. The evaluation device 126 may be configured for determining a bidirectional reflection distribution function 128 of the matched first and second reflection features. The evaluation device 126 may be configured for evaluating the bidirectional reflection distribution function 128 thereby determining the material property. The bidirectional reflection distribution function (BRDF) 128 may be a brightness distribution depending on a viewing angle. The BRDF 128 may be a combined beam profile determined by using two different views on the respective illumination feature. The material property can be modeled by the bidirectional reflection distribution function 128. As described e.g. in J. Filip et al. "BRDF Measurement of Highly-Specular Materials using a Goniometer", preprint submitted to SCCG 2017, April 2017, real-world appearance of spatially homogeneous materials can be represented by means of the BRDF 128. The BRDF 128 may be described as a four-dimensional vector-valued function $f_r(\theta_i, \theta_v, \phi_i, \phi_v)$ of the illumination direction $\omega_i = \{\theta, \phi_i\}$ and the viewing direction $\omega_v = \{\theta_v, \phi_v\}$ that defines how light is reflected at the surface of a material and where $\theta \in [0, \pi/2]$ is the elevation angle and $\phi \in [0, 2\pi]$ is the azimuthal angle of a spherical coordinate system. Two views of the illumination feature on the object may allow to sample the BRDF 128.

The evaluating of the bidirectional reflection distribution function 128 may comprise comparing the bidirectional reflection distribution function 128 to at least one predefined bidirectional reflection distribution function. The predefined bidirectional reflection distribution function may be stored in a table or a lookup table and may be determined e.g. empirically, and may, as an example, be stored in at least one data storage device of the evaluation device 126, e.g. by software, specifically by the app downloaded from an app store or the like.

The reflection feature may be identified as to be generated by a material, e.g. a biological tissue, in case the bidirectional reflection distribution function 128 and the predefined bidirectional reflection distribution function are identical at least within tolerances. The evaluating of the bidirectional reflection distribution function 128 may comprise comparing the bidirectional reflection distribution function 128 to at least one predefined bidirectional reflection distribution function. The comparison may comprise overlaying the bidirectional reflection distribution function 128 and the predefined bidirectional reflection distribution function. The comparison may comprise determining a deviation, e.g. a sum of squared point to point distances, between the bidirectional reflection distribution function 128 and the predefined bidirectional reflection distribution function. The evaluation device 126 may be adapted to compare the determined deviation with at least one threshold, wherein in case the determined deviation is below and/or equal the threshold the surface is indicated as a specific material, e.g. biological tissue. The threshold value may be stored in a table or a lookup table and may be determined e.g. empirically and may, as an example, be stored in at least one data storage device of the evaluation device 126.

FIG. 2 shows a flowchart of an embodiment of a method for determining a material property of at least one object 112 using at least one detector 110 for identifying at least one material property according to the present invention. With respect to the detector 110 reference is made to FIG. 1.

The method steps may be performed in the given order or may be performed in a different order. Further, one or more additional method steps may be present which are not listed. Further, one, more than one or even all of the method steps may be performed repeatedly.

The method comprises the following steps:

a) (130) illuminating the object 112 with at least one illumination pattern 118 comprising a plurality of illumination features 120 by using the projector 116;

b) (132) imaging at least one first reflection image comprising a plurality of first reflection features generated by the object 112 in response to illumination by the illumination features 120 by using the first camera 122, wherein the first camera 122 is arranged such that the first reflection image is imaged under a first direction of view to the object 112;

c) (134) imaging at least one second reflection image comprising a plurality of second reflection features generated by the object 112 in response to illumination by the illumination features 120 by using the second camera 124, wherein the second camera 124 is arranged such that the second reflection image is imaged under a second direction of view to the object 112, wherein the first direction of view and the second direction of view differ;

d) (136) evaluating the first reflection image and the second reflection image by using the evaluation device 126, wherein the evaluation comprises matching the first reflection features and the second reflection features, and determining a combined material property of matched pairs of first and second reflection features by analysis of their beam profiles.

LIST OF REFERENCE NUMBERS

110 detector
112 object
114 mobile device
116 projector
118 illumination pattern
120 illumination feature
122 first camera
124 second camera
126 evaluation device
128 bidirectional reflection distribution function
130 illuminating
132 imaging at least one first reflection image
134 imaging at least one second reflection image
136 evaluating the first reflection image and the second reflection image

The invention claimed is:

1. A detector for determining at least one material property of at least one object, wherein the detector comprises
   at least one projector configured for illuminating the object with at least one illumination pattern comprising a plurality of illumination features;
   at least one first camera having at least one first sensor element, wherein the first sensor element has a matrix of first optical sensors, the first optical sensors each having a light-sensitive area, wherein each first optical sensor is designed to generate at least one sensor signal in response to an illumination of its respective light-sensitive area by a reflection light beam propagating from the object to the first camera, wherein the first camera is configured for imaging at least one first reflection image comprising a plurality of first reflection features generated by the object in response to illumination by the illumination features, wherein the first camera is arranged such that the first reflection image is imaged under a first direction of view to the object;
   at least one second camera having at least one second sensor element, wherein the second sensor element has a matrix of second optical sensors, the second optical sensors each having a light-sensitive area, wherein each second optical sensor is designed to generate at least one sensor signal in response to an illumination of its respective light-sensitive area by a reflection light beam propagating from the object to the second camera, wherein the second camera is configured for imaging at least one second reflection image comprising a plurality of second reflection features generated by the object in response to illumination by the illumination feature, wherein the second camera is arranged such that the second reflection image is imaged under a second direction of view to the object, wherein the first direction of view and the second direction of view differ; and at least one evaluation device configured for evaluating the first reflection image and the second reflection image, wherein the evaluation comprises matching the first reflection features and the second reflection features and determining a combined material property of matched pairs of first and second reflection features by analysis of their beam profiles;

wherein the evaluation device is configured for determining a longitudinal coordinate for each of the first reflection features by analysis of their respective beam profile; and wherein the analysis of the beam profile comprises determining at least one first area and at least one second area of the beam profile, wherein the evaluation device is configured for deriving a combined signal Q by one or more of dividing the first area and the second area, dividing multiples of the first area and the second area, dividing linear combinations of the first area and the second area, wherein the evaluation device is configured for using at least one predetermined relationship between the combined signal Q and a longitudinal coordinate for determining the longitudinal coordinate.

2. The detector according to claim 1, wherein a baseline between the first camera and the projector is shorter than a baseline between the second camera and the projector.

3. The detector according to claim 1, wherein a baseline between the first camera and the projector is 2 cm to 4 cm.

4. The detector according to claim 1, wherein the evaluation device is configured for determining a bidirectional reflection distribution function of the matched pairs of first and second reflection features, wherein the evaluation device is configured for evaluating the bidirectional reflection distribution function thereby determining the combined material property.

5. The detector according to claim 4, wherein the evaluating of the bidirectional reflection distribution function comprises comparing the bidirectional reflection distribution function to at least one predefined bidirectional reflection distribution function.

6. The detector according to claim 1, wherein the evaluation device is configured for determining a first material property by analysis of the beam profile of the first reflection feature and a second material property by analysis of the beam profile of the second reflection feature, wherein the evaluation device is configured for combining the first material property and the second material property for determining the combined material property.

7. The detector according to claim 1, wherein the illumination pattern comprises at least 4000 illumination features.

8. The detector according to claim 1, wherein the illumination pattern is a periodic pattern.

9. The detector according to claim 8, wherein the illumination pattern is a triangular pattern, a rectangular pattern, a hexagonal pattern or a pattern comprising further convex tilings.

10. The detector according to claim 1, wherein the projector comprises an array of emitters.

11. The detector according to claim 10, wherein the projector comprises avertical cavity surface-emitting laser (VCSEL).

12. The detector according to claim 1, wherein the projector emits light of a wavelength of 780 nm to 3.0 µm.

13. The detector according to claim 1, wherein the projector emits light of a wavelength of about 940 nm.

14. The detector according to claim 1, wherein the projector comprises a diffractive optical element (DOE).

15. The detector according to claim 1, wherein the first camera comprises at least one CCD sensor or at least one CMOS sensor, wherein the second camera comprises at least one CCD sensor or at least one CMOS sensor.

16. The detector according to claim 1, wherein the material property is a scattering coefficient, a translucency, a transparency, a deviation from a Lambertian surface reflection, or a speckle.

17. The detector according to claim 1, wherein the material property is assigned to a material classifier classifying the material as skin or non-skin.

18. The detector according to claim 1, wherein the evaluation device is configured for determining at least one material feature by applying at least one material dependent image filter to the image, wherein the material dependent image filter generates an output dependent on the material.

19. The detector according to claim 1, wherein the first area of the beam profile comprises essentially edge information of the beam profile and the second area of the beam profile comprises essentially center information of the beam profile.

20. The detector according to claim 1, wherein the evaluation device is configured for matching the first reflection features and the second reflection features by using the determined longitudinal coordinates, wherein the evaluation device is configured for determining for each of the first reflection features a longitudinal region, wherein the longitudinal region is given by the longitudinal coordinate of the reflection feature and an error interval ±ε, wherein the evaluation device is configured for determining at least one displacement region in the second reflection images corresponding to the longitudinal region, wherein the evaluation device is configured for matching respectively one of the first reflection features with one of the second reflection features within the displacement region.

21. The detector according to claim 1, wherein the evaluation device is configured for determining a displacement of a matched first and second reflection features, wherein the displacement is a difference between an image position of the first reflection feature within the first reflection image to an image position of the second reflection feature within the second reflection image, wherein the evaluation device is configured for determining a refined longitudinal coordinate by triangulation using a predetermined relationship between a longitudinal coordinate and the displacement.

22. The detector according to claim 1, wherein the detector is integrated into a mobile communication device, a tablet computer, or a portable computer.

23. A method for determining a material property of at least one object using the at least one detector for identifying at least one material property according to claim 1, wherein the method comprises the following steps:
   a) illuminating the object with at least one illumination pattern comprising a plurality of illumination features by using the projector;
   b) imaging at least one first reflection image comprising a plurality of first reflection features generated by the object in response to illumination by the illumination features by using the first camera, wherein the first camera is arranged such that the first reflection image is imaged under a first direction of view to the object;
   c) imaging at least one second reflection image comprising a plurality of second reflection features generated by the object in response to illumination by the illumination features by using the second camera, wherein the second camera is arranged such that the second reflection image is imaged under a second direction of view to the object, wherein the first direction of view and the second direction of view differ; and d) evaluating the first reflection image and the second reflection image by using the evaluation device, wherein the evaluation comprises matching the first reflection features and the second reflection features, and determining a combined material property of matched pairs of first and second reflection features by analysis of their beam profiles.

24. A non-transitory computer-readable storage medium comprising instructions which, when the instructions are executed by the detector according to claim 1, cause the detector to perform a method comprising the following steps: a) illuminating the object with at least one illumination pattern comprising a plurality of illumination features by using the projector; b) imaging at least one first reflection image comprising a plurality of first reflection features generated by the object in response to illumination by the illumination features by using the first camera, wherein the first camera is arranged such that the first reflection image is imaged under a first direction of view to the object; c) imaging at least one second reflection image comprising a plurality of second reflection features generated by the object in response to illumination by the illumination features by using the second camera, wherein the second camera is arranged such that the second reflection image is imaged under a second direction of view to the object, wherein the first direction of view and the second direction of view differ; and d) evaluating the first reflection image and the second reflection image by using the evaluation device, wherein the evaluation comprises matching the first reflection features and the second reflection features, and determining a combined material property of matched pairs of first and second reflection features by analysis of their beam profiles.

* * * * *